(12) United States Patent
Tupsamudre et al.

(10) Patent No.: US 11,777,987 B2
(45) Date of Patent: Oct. 3, 2023

(54) METHOD AND SYSTEM FOR LAYERED DETECTION OF PHISHING WEBSITES

(71) Applicant: Tata Consultancy Services Limited, Mumbai (IN)

(72) Inventors: Harshal Tupsamudre, Pune (IN); Sachin Premsukh Lodha, Pune (IN)

(73) Assignee: Tata Consultancy Services Limited., Mumbai (IN)

( * ) Notice: Subject to any disclaimer, the term of this patent is extended or adjusted under 35 U.S.C. 154(b) by 282 days.

(21) Appl. No.: 17/445,294

(22) Filed: Aug. 17, 2021

(65) Prior Publication Data
US 2022/0182410 A1    Jun. 9, 2022

(30) Foreign Application Priority Data
Sep. 21, 2020 (IN) .............................. 202021040849

(51) Int. Cl.
H04L 9/40         (2022.01)
(52) U.S. Cl.
CPC ................................ *H04L 63/1483* (2013.01)
(58) Field of Classification Search
CPC .................................................. H04L 63/1483
See application file for complete search history.

(56) References Cited

U.S. PATENT DOCUMENTS

| 7,849,507 | B1 * | 12/2010 | Bloch | H04L 63/168 |
| | | | | 726/22 |
| 9,276,956 | B2 * | 3/2016 | Geng | G06F 21/55 |
| 10,104,113 | B1 * | 10/2018 | Stein | H04L 63/1425 |
| 10,764,327 | B2 * | 9/2020 | Yao | G06Q 10/107 |
| 11,134,058 | B1 * | 9/2021 | Sole | H04W 12/12 |

(Continued)

FOREIGN PATENT DOCUMENTS

CN         103428196        8/2016

OTHER PUBLICATIONS

Nathan Tuck et al. "Deterministic Memory-Efficient String Matching Algorithms for Intrusion Detection", IEEE INFOCOM, Apr. 2004, IEEE, https://cseweb.ucsd.edu/~calder/paper/INFOCOM-04-IDS.pdf.

(Continued)

*Primary Examiner* — Khang Do
(74) *Attorney, Agent, or Firm* — Finnegan, Henderson, Farabow, Garrett & Dunner, LLP

(57) ABSTRACT

Phishing attacks cause financial frauds and credential thefts. The conventional blacklist, whitelist and Machine Learning (ML) based methods fail to provide an accurate detection of phishing attacks. The present disclosure provides a layered approach wherein a URL domain name is compared with blacklist domains and whitelist domains. Further, the URL undergoes Internet Protocol (IP) address checking followed by context checking. A clicked context is verified based on the number of search results from a popular search engine. Otherwise, the typed context is checked for non-ASCII characters in the domain name. Further, the URL is checked for any brand name. Further, the domain is checked for any misspelling. Further, the URL is examined using a Machine Learning (ML) model. Finally, the URL is classified as phishing if a number hits in a popular search engine is less. Here a phishing alert is generated in each layer based on the corresponding decision.

20 Claims, 15 Drawing Sheets

(56) References Cited

U.S. PATENT DOCUMENTS

| | | | | |
|---|---|---|---|---|
| 2005/0257261 | A1* | 11/2005 | Shraim | G06Q 10/107 726/22 |
| 2006/0212931 | A1* | 9/2006 | Shull | H04L 63/104 726/10 |
| 2007/0192855 | A1* | 8/2007 | Hulten | H04L 63/1483 707/E17.115 |
| 2011/0191849 | A1* | 8/2011 | Jayaraman | H04L 63/1416 715/205 |
| 2012/0158626 | A1* | 6/2012 | Zhu | G06F 21/56 726/22 |
| 2013/0333038 | A1* | 12/2013 | Chien | G06F 21/645 726/23 |
| 2015/0128205 | A1* | 5/2015 | Mahaffey | H04L 63/105 726/1 |
| 2016/0344770 | A1* | 11/2016 | Verma | H04L 51/42 |
| 2016/0352772 | A1* | 12/2016 | O'Connor | H04L 63/1483 |
| 2021/0058428 | A1* | 2/2021 | Arlitt | H04L 63/1416 |

OTHER PUBLICATIONS

Weizhe Zhang et al., "A Memory-Efficient Multi-Pattern Matching Algorithm Based on the Bitmap", Android Platform-based Security Technology, Dec. 2009, IEEE, https://www.researchgate.net/publication/232645013_A_Memory-Efficient_Multi-pattern_Matching_Algorithm_Based_on_the_Bitmap/link/54819cc20cf22525dcb627bc/download.

Paolo Pirredda2 et al., "Deepsquatting: Learning-based Typosquatting Detection at Deeper Domain Levels", Conference of the Italian Association for Artificial Intelligence, Nov. 2017, pp. 347-358, Springer, https://www.researchgate.net/publication/320875510_Deepsquatting_Learning-Based_Typosquatting_Detection_at_Deeper_Domain_Levels/link/5s0ac7370f7e9bb949f9970e/download.

Hong Zhao et al., "Malicious Domain Names Detection Algorithm Based on N-Gram", Journal of Computer Networks and Communications, 2019, vol. 2019 (2), pp. 1-9, Hindawi, https://downloads.hindawi.com/jounrals/jcnc/2019/4612474.pdf.

Farag Ahmed et al., "Revised N-Gram based Automatic Spelling Correction Tool to Improve Retrieval Effectiveness", Polibits, Dec. 2009, Semantic Scholar, https://www.polibits.gelbukh.com/2009_40/40_06.pdf.

Gunikhan Sonowal et al, "PhiDMA—A phising detection model with multi-filter approach", Journal of King Saud University—Computer and Information Sciences, Jan. 2020, vol. 32, Issue 1, pp. 99-112, Science Direct, https://www.sciencedirect.com/sdfe/reader/pii/S1319157817301210/pdf.

* cited by examiner

METHOD AND SYSTEM FOR LAYERED DETECTION OF PHISHING WEBSITES

PRIORITY CLAIM

This U.S. patent application claims priority under 35 U.S.C. § 119 to: India Application No. 202021040849, filed on Sep. 21, 2020. The entire contents of the aforementioned application are incorporated herein by reference.

TECHNICAL FIELD

The disclosure herein generally relates to the field of cyber security and, more particular, to a method and system for layered detection of phishing websites.

BACKGROUND

The proliferation of the Internet has not only facilitated the revolution of electronic commerce but also opened new avenues for committing cyber-crimes like phishing attacks. Phishing attack is a fraudulent attempt to obtain sensitive information of a user like, credit card details, debit card details, passwords, and the like by disguising oneself as a trustworthy entity. In a phishing website attack, a legitimate URL is carefully modified by a hacker so that the modification is not visible to a user and fraudulent activities are carried out.

Conventional methods utilize blacklist and whitelist based filtering as well as Machine Learning (ML) based detection techniques. The blacklist includes prohibited domains and the whitelist includes benign domains. Further, the conventional methods rely on the hit results from a popular search engine. However, the blacklist based filtering methods fails to protect the user against zero hour phishing attacks. Further, the ML model requires representative URL samples to train the model, which is challenging to obtain. The whitelist based filtering of URL is inefficient due to biased whitelist databases. Hence accurate detection of phishing URLs is a challenging task.

SUMMARY

Embodiments of the present disclosure present technological improvements as solutions to one or more of the above-mentioned technical problems recognized by the inventors in conventional systems. For example, in one embodiment, a method for layered detection of phishing websites. The method includes receiving a Uniform Resource Locator (URL) from a browser. The URL comprises a protocol name, a hostname and a pathname separated by at least one symbol. Further, method includes extracting the domain name from the hostname of the URL. Further, method includes comparing the domain name with a plurality of prohibited domain names stored in a blacklist, wherein a phishing alert is generated when the domain name matches with at least one prohibited domain name stored in the blacklist. Furthermore, method includes comparing the domain name with a plurality of popular domain names associated with a plurality of whitelists to check whether the URL is benign when the domain name is not matching with the at least one prohibited domain names stored in the blacklist, wherein the plurality of whitelist comprising a local whitelist, a community whitelist, a global whitelist and a session whitelist, wherein the user is allowed to access if the URL is benign URL. The global whitelist comprises a plurality of popular domains across the globe. Further, method includes identifying whether the hostname of the URL is an Internet Protocol (IP) address when the URL is not the benign URL. The phishing alert is generated when the hostname of the URL is the IP address. Further, method includes obtaining a transition type associated with the URL when the hostname of the URL is other than the IP address. The transition type can be a clicked URL or a typed URL. Further, method includes identifying whether the clicked URL is a result of a keyword based search associated with a popular search engine. The URL is allowed to access when the URL is the result of the keyword based search associated with the popular search engine and when the number of search results comprising the clicked URL is greater than a predefined keyword based search result threshold. Furthermore, method includes identifying whether the clicked URL is having at least one non-ASCII character when the URL is not the result of the keyword based search associated with the popular search engine. Furthermore, method includes analyzing the domain pertaining to the clicked URL to identify the IDN (Internationalized Domain Name) homograph attack, when the clicked URL includes at least one non-ASCII character, by: (i) normalizing a plurality of non-ASCII characters associated with the domain based on a Normalization Form Compatibility Decomposition (NFKD), wherein the NFKD decomposes each of a plurality of accented symbols associated with the domain into a Unicode symbol and an acute accent (ii) substituting each of a plurality of Unicode symbols associated with the domain with a corresponding ASCII character based on a confusable map to obtain an ASCII domain. The confusable map provides a mapping between a plurality of the Unicode symbols and a plurality of ASCII symbols (iii) matching the ASCII domain with the plurality of domains associated with each of the plurality of whitelists (iv) generating an IDN attack alarm when the ASCII domain name matches with at least one domain name in each of the plurality of whitelists. Furthermore, method includes identifying a popular domain name in the URL by matching the ASCII domain name with a plurality of domain names associated with the global whitelist using a Top Level Domain (TLD) compressed Lex Trie based Deterministic Finite Automaton (DFA) when the clicked URL does not include at least one non-ASCII character. The phishing alert is generated when the popular name is identified in the URL. Furthermore, method includes identifying a misspelled popular domain name corresponding to the ASCII domain name based on an n-gram based approximate matching algorithm based on a plurality of conditions. The plurality of conditions includes at least one of, the URL does not include any popular domain, the domain of the URL is not prone to IDN homograph attack and the URL is typed. Further, method includes sorting each of a plurality of ASCII symbols associated with the ASCII domain name in lexicographic order. Furthermore, method includes dividing the plurality of sorted ASCII symbols into a plurality of domain parts based on a predetermined error tolerance value. Each of the plurality of domain parts are of approximately equal size. Furthermore, method includes extracting a plurality of trigrams from each of the plurality of domain parts. Further, method includes obtaining a frequency value for each of the plurality of trigrams corresponding to each of the plurality of domain parts from a frequency dictionary, wherein the frequency dictionary is constructed by: (i) obtaining a plurality of popular domain names from the global whitelist (ii) sorting each of a plurality of symbols corresponding to each of the plurality of popular domain names in lexicographic order (iii) extracting a plurality of trigrams from the plurality of sorted symbols corresponding to each of the plurality of domain names (iv) generating a trigram dictionary based on the extracted trigrams, wherein each row of the trigram dictionary comprises a global whitelist index of a popular domain name, a plurality of sorted symbols corresponding to the popular domain name and a plurality of trigrams corresponding to the popular domain name (v) constructing a frequency dictionary based on the trigram dictionary, wherein each row of the frequency dictionary comprises a trigram, a plurality of trigram dictionary indices associated with the trigram and a frequency value corresponding to the trigram, wherein the frequency value is the number of trigram dictionary indices associated with the trigram. Furthermore, method includes sorting each of the plurality of trigrams corresponding to the plurality of domain parts in ascending order based on the corresponding frequency value. Furthermore, method includes obtaining a plurality of candidate domain names by extracting each domain name pointed by each of the plurality of sorted trigrams based on the corresponding index and the frequency value. A number of candidate domain names pointed by a trigram is equivalent to the corresponding frequency. Furthermore, method includes computing an intersection between each of the plurality of candidate domain names to obtain a plurality of misspelled domain names. Furthermore, method includes computing an edit distance between the plurality of misspelled domain names and the ASCII domain name. Furthermore, method includes obtaining the misspelled popular domain name based on the edit distance, wherein the misspelled domain name with an edit distance less than the predetermined edit distance is selected as the misspelled popular domain name. Furthermore, method includes updating session whitelist with the misspelled popular domain name. Furthermore, method includes computing a phishing probability using logistic regression based on a plurality of features when the domain is not the misspelled popular domain or when the number of search results comprising the clicked URL is greater than the predefined keyword based search result threshold. Furthermore, method includes obtaining a number of hits by performing a search operation with the URL in a popular search engine when the phishing probability is less than the predefined probability threshold. Finally, method includes classifying the URL as phishing URL when the number of hits is less than a predefined hit threshold, wherein the session whitelist is updated if the URL is not a phishing URL.

In another aspect, a system for layered detection of phishing websites is provided. The system includes at least one memory storing programmed instructions, one or more Input/Output (I/O) interfaces, and one or more hardware processors operatively coupled to the at least one memory, wherein the one or more hardware processors are configured by the programmed instructions to receive a Uniform Resource Locator (URL) from a browser. The URL comprises a protocol name, a hostname and a pathname separated by at least one symbol. Further, the one or more hardware processors are configured by the programmed instructions to extract the domain name from the hostname of the URL. Further, the one or more hardware processors are configured by the programmed instructions to compare the domain name with a plurality of prohibited domain names stored in a blacklist, wherein a phishing alert is generated when the domain name matches with at least one prohibited domain name stored in the blacklist. Furthermore, the one or more hardware processors are configured by the programmed instructions to compare the domain name with a plurality of popular domain names associated with a plurality of whitelists to check whether the URL is benign when the domain name is not matching with the at least one prohibited domain names stored in the blacklist, wherein the plurality of whitelist comprising a local whitelist, a community whitelist, a global whitelist and a session whitelist, wherein the user is allowed to access if the URL is benign URL. The global whitelist comprises a plurality of popular domains across the globe. Further, the one or more hardware processors are configured by the programmed instructions to identifying whether the hostname of the URL is an Internet Protocol (IP) address when the URL is not the benign URL. The phishing alert is generated when the hostname of the URL is the IP address. Further, the one or more hardware processors are configured by the programmed instructions to obtain a transition type associated with the URL when the hostname of the URL is other than the IP address. The transition type can be a clicked URL or a typed URL. Further, the one or more hardware processors are configured by the programmed instructions to identify whether the clicked URL is a result of a keyword based search associated with a popular search engine. The URL is allowed to access when the URL is the result of the keyword based search associated with the popular search engine and when the number of search results comprising the clicked URL is greater than a predefined keyword based search result threshold. Furthermore, the one or more hardware processors are configured by the programmed instructions to identify whether the clicked URL is having at least one non-ASCII character when the URL is not the result of the keyword based search associated with the popular search engine. Furthermore, the one or more hardware processors are configured by the programmed instructions to analyze the domain pertaining to the clicked URL to identify the IDN (Internationalized Domain Name) homograph attack, when the clicked URL includes at least one non-ASCII character, by: (i) normalizing a plurality of non-ASCII characters associated with the domain based on a Normalization Form Compatibility Decomposition (NFKD), wherein the NFKD decomposes each of a plurality of accented symbols associated with the domain into a Unicode symbol and an acute accent (ii) substituting each of a plurality of Unicode symbols associated with the domain with a corresponding ASCII character based on a confusable map to obtain an ASCII domain. The confusable map provides a mapping between a plurality of the Unicode symbols and a plurality of ASCII symbols (iii) matching the ASCII domain with the plurality of domains associated with each of the plurality of whitelists (iv) generating an IDN attack alarm when the ASCII domain name matches with at least one domain name in each of the plurality of whitelists. Furthermore, the one or more hardware processors are configured by the programmed instructions to identify a popular domain name in the URL by matching the ASCII domain name with a plurality of domain names associated with the global whitelist using a Top Level Domain (TLD) compressed Lex Trie based Deterministic Finite Automaton (DFA) when the clicked URL does not include at least one non-ASCII character. The phishing alert is generated when the popular name is identified in the URL. Furthermore, the one or more hardware processors are configured by the programmed instructions to identify a misspelled popular domain name corresponding to the ASCII domain name based on an n-gram based approximate matching algorithm based on a plurality of conditions. The plurality of conditions includes at least one of, the URL does not include any popular domain, the domain of the URL is not prone to IDN homograph attack and the URL is typed. Furthermore, the one or more hardware processors are configured by the programmed instructions to sort each of a plurality of ASCII symbols associated with the ASCII domain name in lexicographic order. Furthermore, the one or more hardware processors are configured by the programmed instructions to divide the plurality of sorted ASCII symbols into a plurality of domain parts based on a predetermined error tolerance value. Each of the plurality of domain parts are of approximately equal size. Furthermore, the one or more hardware processors are configured by the programmed instructions to extract a plurality of trigrams from each of the plurality of domain parts. Furthermore, the one or more hardware processors are configured by the programmed instructions to obtain a frequency value for each of the plurality of trigrams corresponding to each of the plurality of domain parts from a frequency dictionary, wherein the frequency dictionary is constructed by: (i) obtaining a plurality of popular domain names from the global whitelist (ii) sorting each of a plurality of symbols corresponding to each of the plurality of popular domain names in lexicographic order (iii) extracting a plurality of trigrams from the plurality of sorted symbols corresponding to each of the plurality of domain names (iv) generating a trigram dictionary based on the extracted trigrams, wherein each row of the trigram dictionary comprises a global whitelist index of a popular domain name, a plurality of sorted symbols corresponding to the popular domain name and a plurality of trigrams corresponding to the popular domain name (v) constructing a frequency dictionary based on the trigram dictionary, wherein each row of the frequency dictionary comprises a trigram, a plurality of trigram dictionary indices associated with the trigram and a frequency value corresponding to the trigram, wherein the frequency value is the number of trigram dictionary indices associated with the trigram. Furthermore, the one or more hardware processors are configured by the programmed instructions to sort each of the plurality of trigrams corresponding to the plurality of domain parts in ascending order based on the corresponding frequency value. Furthermore, the one or more hardware processors are configured by the programmed instructions to obtain a plurality of candidate domain names by extracting each domain name pointed by each of the plurality of sorted trigrams based on the corresponding index and the frequency value. A number of candidate domain names pointed by a trigram is equivalent to the corresponding frequency. Furthermore, the one or more hardware processors are configured by the programmed instructions to compute an intersection between each of the plurality of candidate domain names to obtain a plurality of misspelled domain names. Furthermore, the one or more hardware processors are configured by the programmed instructions to compute an edit distance between the plurality of misspelled domain names and the ASCII domain name. Furthermore, the one or more hardware processors are configured by the programmed instructions to obtain the misspelled popular domain name based on the edit distance, wherein the misspelled domain name with an edit distance less than the predetermined edit distance is selected as the misspelled popular domain name. Furthermore, the one or more hardware processors are configured by the programmed instructions to update session whitelist with the misspelled popular domain name. Furthermore, the one or more hardware processors are configured by the programmed instructions to compute a phishing probability using logistic regression based on a plurality of features when the domain is not the misspelled popular domain or when the number of search results comprising the clicked URL is greater than the predefined keyword based search result threshold. Furthermore, the one or more hardware processors are configured by the programmed instructions to obtain a number of hits by performing a search operation with the URL in a popular search engine when the phishing probability is less than the predefined probability threshold. Finally, the one or more hardware processors are configured by the programmed instructions to classify the URL as phishing URL when the number of hits is less than a predefined hit threshold, wherein the session whitelist is updated if the URL is not a phishing URL.

In yet another aspect, a computer program product including a non-transitory computer-readable medium having embodied therein a computer program for method and system for layered detection of phishing websites is provided. The computer readable program, when executed on a computing device, causes the computing device to receive to receive a Uniform Resource Locator (URL) from a browser. The URL comprises a protocol name, a hostname and a pathname separated by at least one symbol. Further, the computer readable program, when executed on a computing device, causes the computing device to extract the domain name from the hostname of the URL. Further, the computer readable program, when executed on a computing device, causes the computing device to compare the domain name with a plurality of prohibited domain names stored in a blacklist, wherein a phishing alert is generated when the domain name matches with at least one prohibited domain name stored in the blacklist. Furthermore, the computer readable program, when executed on a computing device, causes the computing device to compare the domain name with a plurality of popular domain names associated with a plurality of whitelists to check whether the URL is benign when the domain name is not matching with the at least one prohibited domain names stored in the blacklist, wherein the plurality of whitelist comprising a local whitelist, a community whitelist, a global whitelist and a session whitelist, wherein the user is allowed to access if the URL is benign URL. The global whitelist comprises a plurality of popular domains across the globe. Furthermore, the computer readable program, when executed on a computing device, causes the computing device to identifying whether the hostname of the URL is an Internet Protocol (IP) address when the URL is not the benign URL. The phishing alert is generated when the hostname of the URL is the IP address. Furthermore, the computer readable program, when executed on a computing device, causes the computing device to obtain a transition type associated with the URL when the hostname of the URL is other than the IP address. The transition type can be a clicked URL or a typed URL. Furthermore, the computer readable program, when executed on a computing device, causes the computing device to identify whether the clicked URL is a result of a keyword based search associated with a popular search engine. The URL is allowed to access when the URL is the result of the keyword based search associated with the popular search engine and when the number of search results comprising the clicked URL is greater than a predefined keyword based search result threshold. Furthermore, the computer readable program, when executed on a computing device, causes the computing device to identify whether the clicked URL is having at least one non-ASCII character when the URL is not the result of the keyword based search associated with the popular search engine. Furthermore, the computer readable program, when executed on a computing device, causes the computing device to analyze the domain pertaining to the clicked URL to identify the IDN (Internationalized Domain Name) homograph attack, when the clicked URL includes at least one non-ASCII character, by: (i) normalizing a plurality of non-ASCII characters associated with the domain based on a Normalization Form Compatibility Decomposition (NFKD), wherein the NFKD decomposes each of a plurality of accented symbols associated with the domain into a Unicode symbol and an acute accent (ii) substituting each of a plurality of Unicode symbols associated with the domain with a corresponding ASCII character based on a confusable map to obtain an ASCII domain. The confusable map provides a mapping between a plurality of the Unicode symbols and a plurality of ASCII symbols (iii) matching the ASCII domain with the plurality of domains associated with each of the plurality of whitelists (iv) generating an IDN attack alarm when the ASCII domain name matches with at least one domain name in each of the plurality of whitelists. Furthermore, the computer readable program, when executed on a computing device, causes the computing device to identify a popular domain name in the URL by matching the ASCII domain name with a plurality of domain names associated with the global whitelist using a Top Level Domain (TLD) compressed Lex Trie based Deterministic Finite Automaton (DFA) when the clicked URL does not include at least one non-ASCII character. The phishing alert is generated when the popular name is identified in the URL. Furthermore, the computer readable program, when executed on a computing device, causes the computing device to identify a misspelled popular domain name corresponding to the ASCII domain name based on an n-gram based approximate matching algorithm based on a plurality of conditions. The plurality of conditions includes at least one of, the URL does not include any popular domain, the domain of the URL is not prone to IDN homograph attack and the URL is typed. Furthermore, the computer readable program, when executed on a computing device, causes the computing device to sort each of a plurality of ASCII symbols associated with the ASCII domain name in lexicographic order. Furthermore, the computer readable program, when executed on a computing device, causes the computing device to divide the plurality of sorted ASCII symbols into a plurality of domain parts based on a predetermined error tolerance value. Each of the plurality of domain parts are of approximately equal size. Furthermore, the computer readable program, when executed on a computing device, causes the computing device to extract a plurality of trigrams from each of the plurality of domain parts. Furthermore, the computer readable program, when executed on a computing device, causes the computing device to obtain a frequency value for each of the plurality of trigrams corresponding to each of the plurality of domain parts from a frequency dictionary, wherein the frequency dictionary is constructed by: (i) obtaining a plurality of popular domain names from the global whitelist (ii) sorting each of a plurality of symbols corresponding to each of the plurality of popular domain names in lexicographic order (iii) extracting a plurality of trigrams from the plurality of sorted symbols corresponding to each of the plurality of domain names (iv) generating a trigram dictionary based on the extracted trigrams, wherein each row of the trigram dictionary comprises a global whitelist index of a popular domain name, a plurality of sorted symbols corresponding to the popular domain name and a plurality of trigrams corresponding to the popular domain name (v) constructing a frequency dictionary based on the trigram dictionary, wherein each row of the frequency dictionary comprises a trigram, a plurality of trigram dictionary indices associated with the trigram and a frequency value corresponding to the trigram, wherein the frequency value is the number of trigram dictionary indices associated with the trigram. Furthermore, the computer readable program, when executed on a computing device, causes the computing device to sort each of the plurality of trigrams corresponding to the plurality of domain parts in ascending order based on the corresponding frequency value. Furthermore, the computer readable program, when executed on a computing device, causes the computing device to obtain a plurality of candidate domain names by extracting each domain name pointed by each of the plurality of sorted trigrams based on the corresponding index and the frequency value. A number of candidate domain names pointed by a trigram is equivalent to the corresponding frequency. Furthermore, the computer readable program, when executed on a computing device, causes the computing device to compute an intersection between each of the plurality of candidate domain names to obtain a plurality of misspelled domain names. Furthermore, the computer readable program, when executed on a computing device, causes the computing device to compute an edit distance between the plurality of misspelled domain names and the ASCII domain name. Furthermore, the computer readable program, when executed on a computing device, causes the computing device to obtain the misspelled popular domain name based on the edit distance, wherein the misspelled domain name with an edit distance less than the predetermined edit distance is selected as the misspelled popular domain name. Furthermore, the computer readable program, when executed on a computing device, causes the computing device to update session whitelist with the misspelled popular domain name. Furthermore, the computer readable program, when executed on a computing device, causes the computing device to compute a phishing probability using logistic regression based on a plurality of features when the domain is not the misspelled popular domain or when the number of search results comprising the clicked URL is greater than the predefined keyword based search result threshold. Furthermore, the computer readable program, when executed on a computing device, causes the computing device to obtain a number of hits by performing a search operation with the URL in a popular search engine when the phishing probability is less than the predefined probability threshold. Finally, the computer readable program, when executed on a computing device, causes the computing device to classify the URL as phishing URL when the number of hits is less than a predefined hit threshold, wherein the session whitelist is updated if the URL is not a phishing URL.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
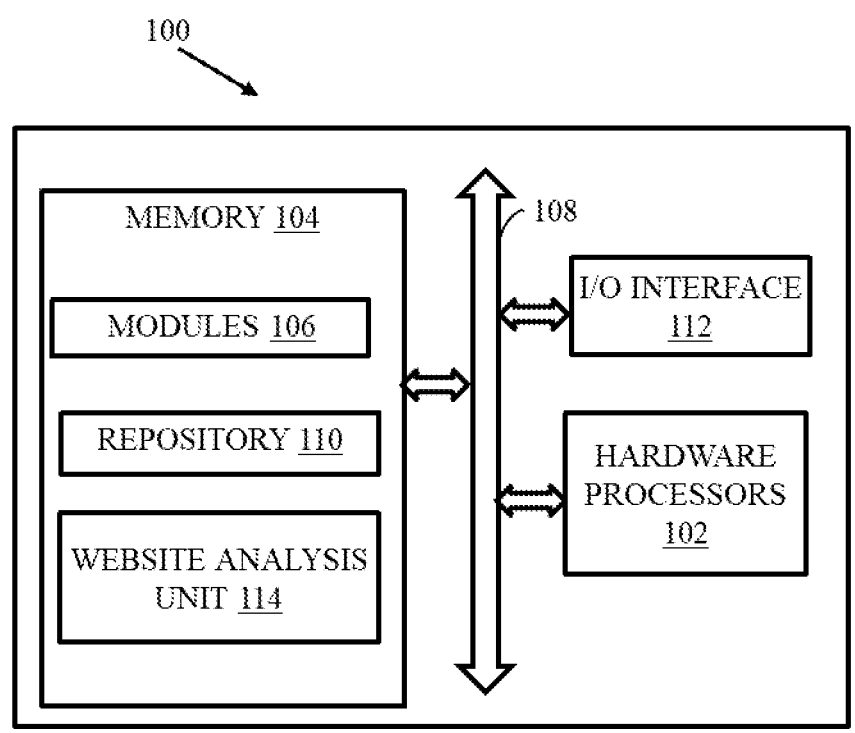
FIG. 1 is a functional block diagram of a system for Layered detection of phishing websites, according to some embodiments of the present disclosure.
Figure 2A:
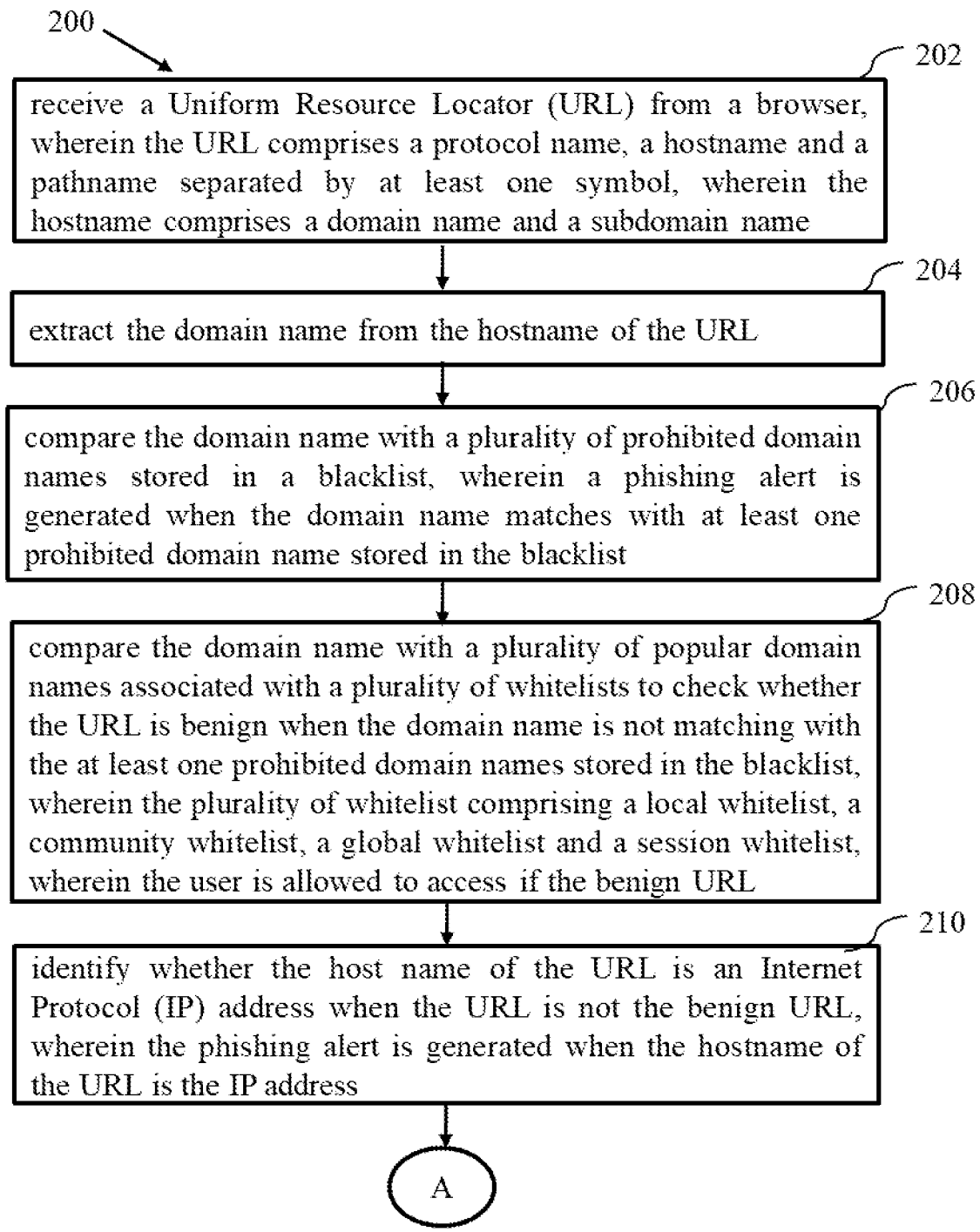
FIGS. 2A to 2F are exemplary flow diagrams for a method for Layered detection of phishing websites implemented by the system of FIG. 1, in accordance with some embodiments of the present disclosure.
Figure 2B:
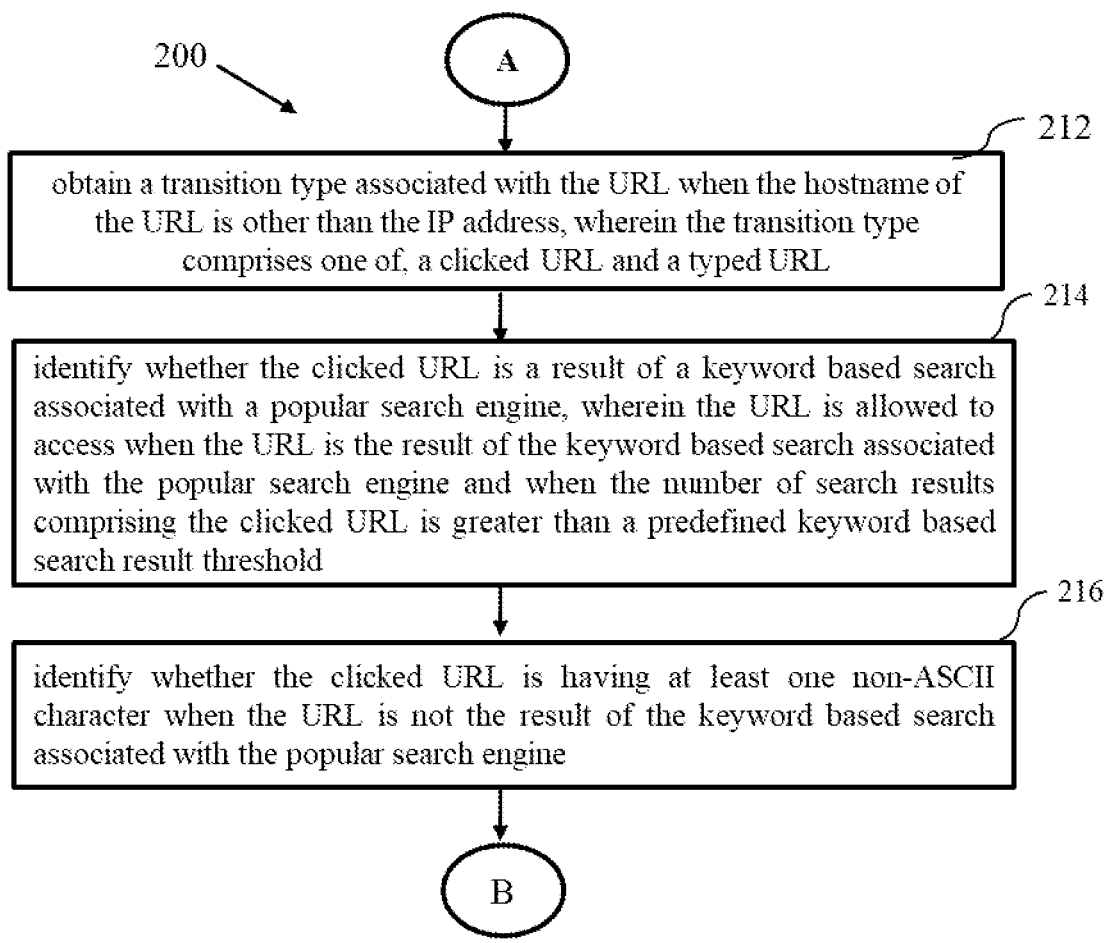
Figure 2C:
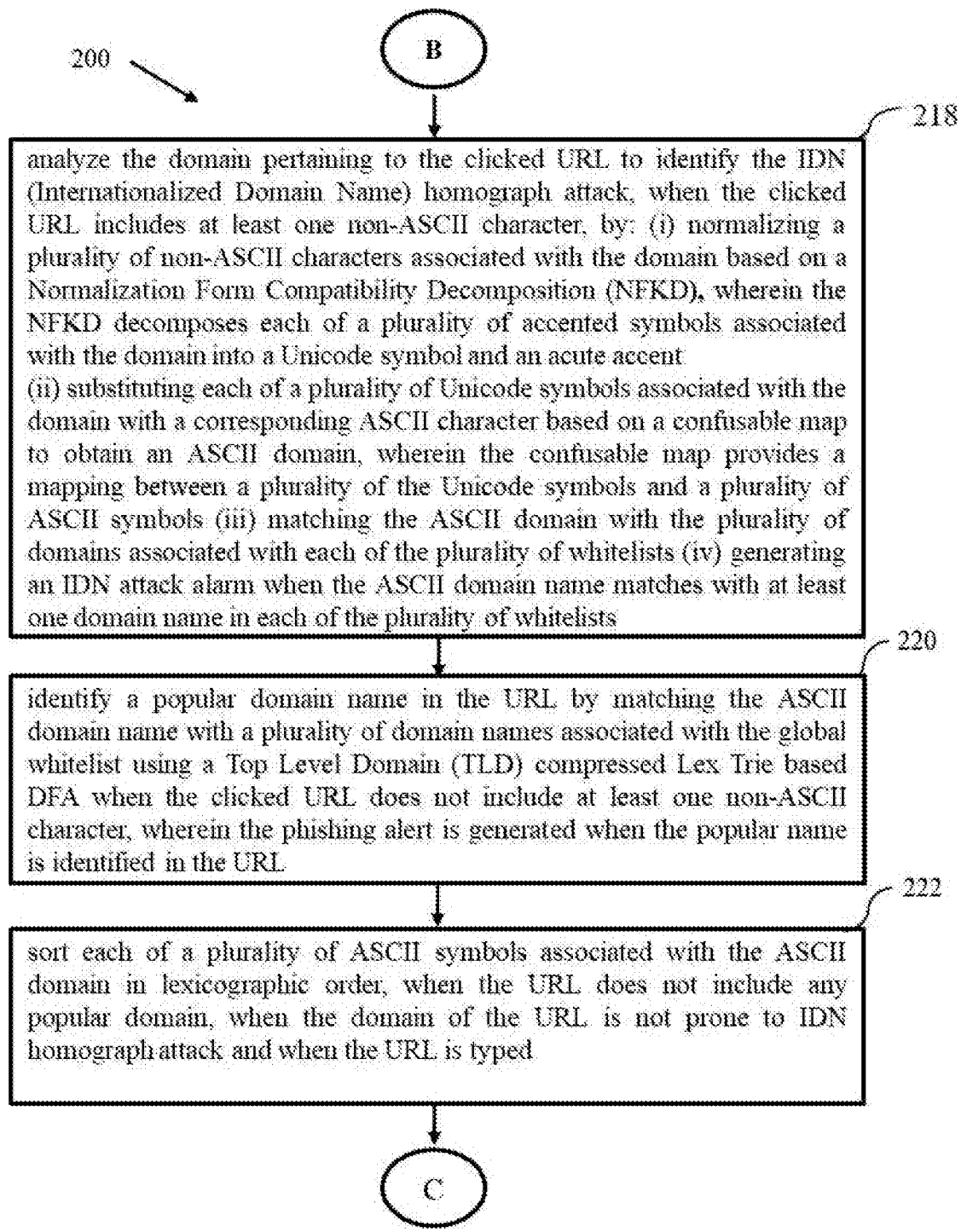
Figure 2D:
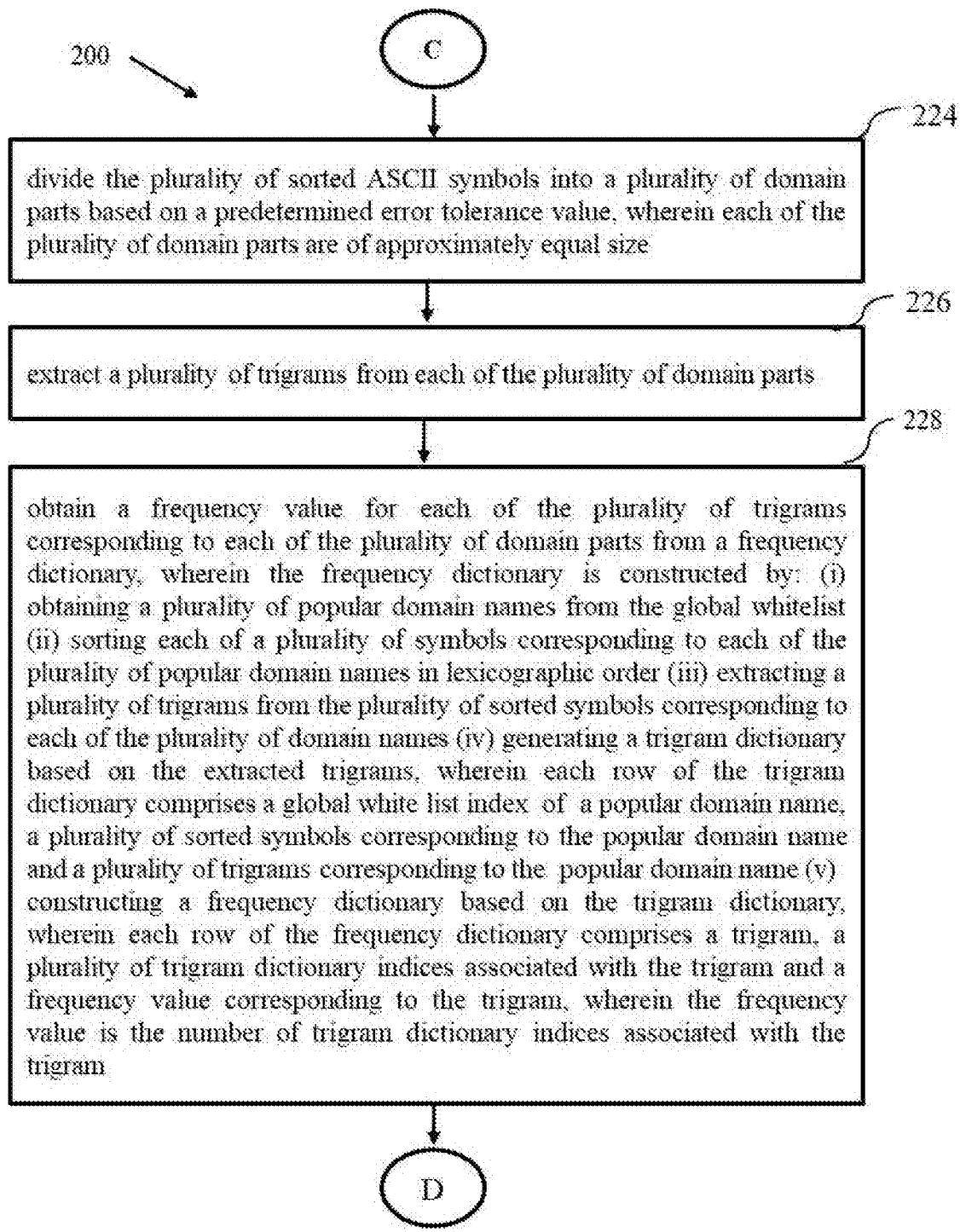
Figure 2E:
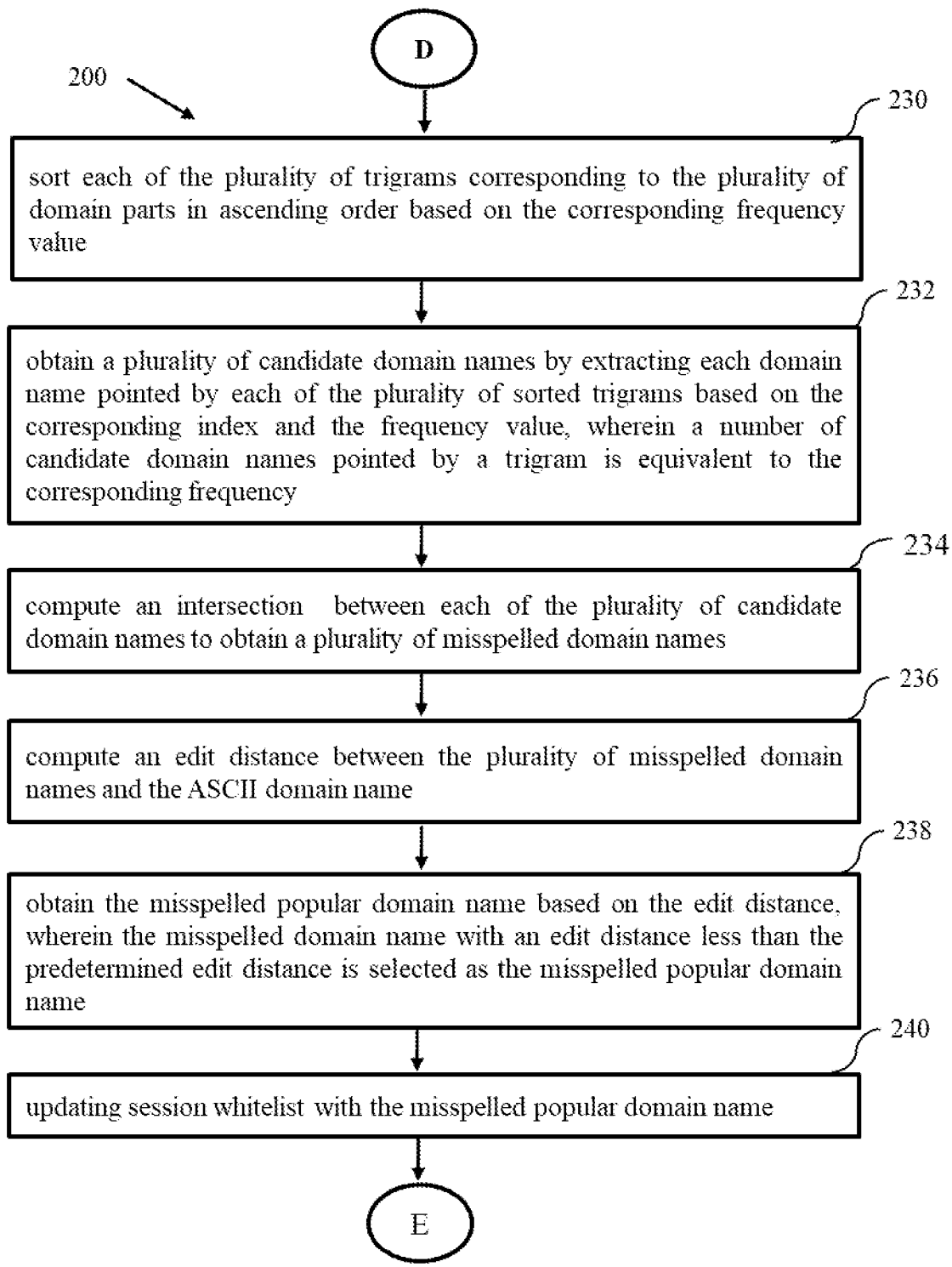
Figure 2F:
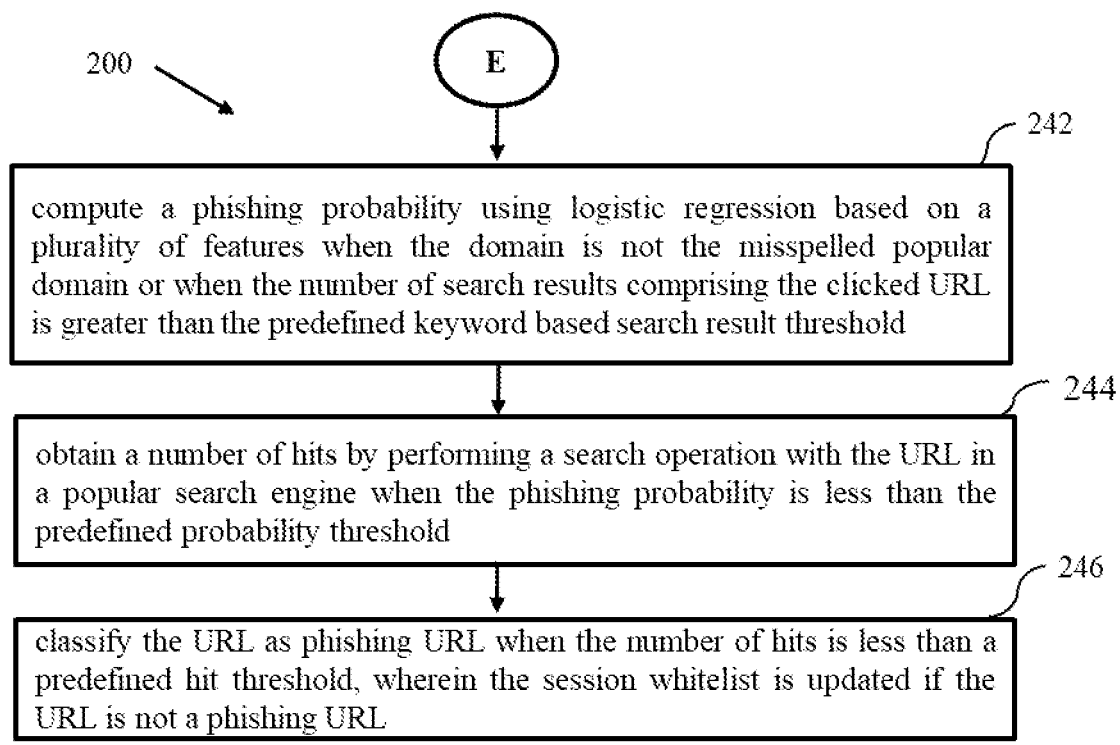

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Embodiments herein provide a method and system for layered detection of phishing websites. The system for Layered detection of phishing websites provides a robust, accurate and efficient client-side detection of phishing attacks. Initially, the system receives a Uniform Resource Locator (URL) from a browser. A domain name associated with the URL is extracted and compared with a plurality of prohibited domains stored in a blacklist. A phishing alert is generated when there is a match and the domain name is compared with a plurality of whitelist domains when there is no match with the blacklisted domains. The plurality of whitelisted are benign domains. If the domain name of the URL matches with at least one domain from the plurality of domains in a plurality of whitelists, the URL is identified as a benign URL. If the domain name does not match with at least one whitelist domain, a hostname of the URL is checked for presence of any Internet Protocol (IP) address. The phishing alarm is generated when the hostname is an IP address. Further, a context of the URL is checked when the hostname is not an IP address. The context is either typed or clicked. If the context of the URL is clicked, the URL is initially verified whether the URL is a part of any keyword based search in a popular search engine. If the URL is the result of the keyword based search, the number of search results are obtained and if the number of search results is above a search threshold, the URL is allowed to access. When the URL is not a result of a keyword-based search, the domain is checked for any presence of non-ASCII characters. If non-ASCII characters are present, then an alert is generated for IDN homograph attack. Otherwise, the URL is checked for presence of any brand name or a popular domain name. If brand name is present in the URL, the phishing alert is generated. If there is no brand name in the URL, the domain is checked for any misspelling using an n-gram based approach. If the domain is a misspelling, the phishing alert is generated. If the domain is not misspelled, the URL is examined using a Machine Learning (ML) model. If a probability of phishing computed by the ML model is greater than a predefined probability threshold, the phishing alert is generated. Otherwise, the URL is searched in the popular search engine and if a number hits is greater than a hit threshold, the URL is classified as benign. Otherwise, the URL is classified as phishing URL and the phishing alert is generated.

Referring now to the drawings, and more particularly to FIGS. 1 through 5B, where similar reference characters denote corresponding features consistently throughout the figures, there are shown preferred embodiments and these embodiments are described in the context of the following exemplary system and/or method.

FIG. 1 is a functional block diagram of a system 100 for Layered detection of phishing websites, according to some embodiments of the present disclosure. The system 100 includes or is otherwise in communication with hardware processors 102, at least one memory such as a memory 104, an I/O interface 112. The hardware processors 102, memory 104, and the Input/Output (I/O) interface 112 may be coupled by a system bus such as a system bus 108 or a similar mechanism. In an embodiment, the hardware processors 102 can be one or more hardware processors.

The I/O interface 112 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the interface 112 may enable the system 100 to communicate with other devices, such as web servers and external databases.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting a number of computing systems with one another or to another server computer. The I/O interface 112 may include one or more ports for connecting a number of devices to one another or to another server.

The one or more hardware processors 102 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 102 is configured to fetch and execute computer-readable instructions stored in the memory 104.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 104 includes a plurality of modules 106 and a website analysis unit 114. The memory 104 also includes a data repository (or repository) 110 for storing data processed, received, and generated by the plurality of modules 106 and the website analysis unit 114. The data repository further includes the blacklist, session whitelist, local whitelist, community whitelist, global whitelist the training and testing data associated with the ML model.

The plurality of modules 106 include programs or coded instructions that supplement applications or functions performed by the system 100 for Layered detection of phishing websites. The plurality of modules 106, amongst other things, can include routines, programs, objects, components, and data structures, which performs particular tasks or implement particular abstract data types. The plurality of modules 106 may also be used as, signal processor(s), node machine(s), logic circuitries, and/or any other device or component that manipulates signals based on operational instructions. Further, the plurality of modules 106 can be used by hardware, by computer-readable instructions executed by the one or more hardware processors 102, or by a combination thereof. The plurality of modules 106 can include various sub-modules (not shown). The plurality of modules 106 may include computer-readable instructions that supplement applications or functions performed by the system 100 for Layered detection of phishing websites.

The data repository (or repository) 110 may include a plurality of abstracted piece of code for refinement and data that is processed, received, or generated as a result of the execution of the plurality of modules in the module(s) 106 and the modules associated with the website analysis unit 114.

Although the data repository 110 is shown internal to the system 100, it will be noted that, in alternate embodiments, the data repository 110 can also be implemented external to the system 100, where the data repository 110 may be stored within a database (not shown in FIG. 1) communicatively coupled to the system 100. The data contained within such external database may be periodically updated. For example, new data may be added into the database (not shown in FIG. 1) and/or existing data may be modified and/or non-useful data may be deleted from the database (not shown in FIG. 1). In one example, the data may be stored in an external system, such as a Lightweight Directory Access Protocol (LDAP) directory and a Relational Database Management System (RDBMS).

FIGS. 2A to 2F are exemplary flow diagrams for a processor implemented method for layered detection of phishing websites implemented by the system of FIG. 1, according to some embodiments of the present disclosure. In an embodiment, the system 100 comprises one or more data storage devices or the memory 104 operatively coupled to the one or more hardware processor(s) 102 and is configured to store instructions for execution of steps of the method 200 by the one or more hardware processors 102. The steps of the method 200 of the present disclosure will now be explained with reference to the components or blocks of the system 100 as depicted in FIG. 1 and the steps of flow diagram as depicted in FIG. 2A to FIG. 2F. The method 200 may be described in the general context of computer executable instructions. Generally, computer executable instructions can include routines, programs, objects, components, data structures, procedures, modules, functions, etc., that perform particular functions or implement particular abstract data types. The method 200 may also be practiced in a distributed computing environment where functions are performed by remote processing devices that are linked through a communication network. The order in which the method 200 is described is not intended to be construed as a limitation, and any number of the described method blocks can be combined in any order to implement the method 200, or an alternative method. Furthermore, the method 200 can be implemented in any suitable hardware, software, firmware, or combination thereof.

Figure 4A:
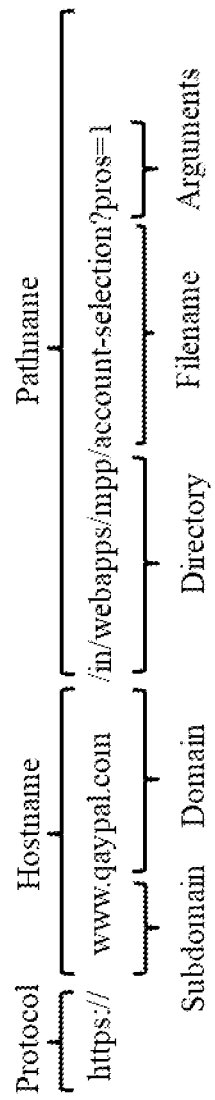
FIG. 4A is an exemplary Uniform Resource Locator (URL) component for the method for Layered detection of phishing websites implemented by the system of FIG. 1, in accordance with some embodiments of the present disclosure.

At step 202 of the method 200, the one or more hardware processors 102 receive a Uniform Resource Locator (URL) from a browser. The URL comprises a protocol name, a hostname and a pathname separated by at least one symbol as shown in FIG. 4A. The hostname comprises a domain name and a subdomain name. For example, in the URL https://www.xyz.com/abc/bxy/ac=1, "https" is the protocol name, www.xyz.com is the hostname and "/abc/bxy/ac=1" is the path name. Further, in the hostname "www.xyz.com", "www" is the subdomain and "xyz.com" is the domain name.

At step 204 of the method 200, the one or more hardware processors 102 extract the domain name from the hostname of the URL. For example, "xyz.com".

At step 206 of the method 200, the one or more hardware processors 102 compare the domain name with a plurality of prohibited domain names stored in a blacklist, wherein a phishing alert is generated when the domain name matches with at least one prohibited domain name stored in the blacklist.

At step 208 of the method 200, the one or more hardware processors 102 compare the domain name with a plurality of popular domain names associated with a plurality of whitelists to check whether the URL is benign when the domain name is not matching with the at least one prohibited domain names stored in the blacklist, wherein the plurality of whitelist comprising a local whitelist, a community whitelist, a global whitelist and a session whitelist, wherein the user is allowed to access if the URL is benign URL. The global whitelist comprises a plurality of popular domains across the globe.

In an embodiment, the step of comparing the domain name with the plurality of popular domain names associated with the plurality of whitelists includes the following steps: Initially the domain name is compared with the plurality of popular domain names associated with the session whitelist. If the domain name is not matching with at least one popular domain name in the session whitelist, further, the domain name is compared with the plurality of popular domain names associated with the local whitelist. If the domain name is not matching with at least one popular domain name in the local whitelist, the domain name is compared with the plurality of popular domain names associated with the community whitelist, when the domain name is not matching with at least one popular domain name in the local whitelist. If the domain name is not matching with at least one popular domain name in the community whitelist, the domain name is compared with the plurality of popular domain names associated with the global whitelist, In an embodiment, the local whitelist is generated by: (i) obtaining a plurality of browsing features associated with each of a plurality of domains from a browsing history of a user. The plurality of browsing features includes an age value, a visit value, a recency value and a typed value. The age is a difference in time between a recent access to a domain and an oldest access to the domain. The visit value is a number of unique days on which the user visited a domain. The recency value is a time difference between the current time and a recent access time of a domain. The typed value is a Boolean value, set to one if the domain is typed and set to zero if the domain clicked (ii) computing a score corresponding to each of the plurality of domains based on a decision tree, wherein the decision tree is created by assigning a score for each of the plurality of domains based on a predefined threshold corresponding to each of the plurality of browsing features. For example, mostly the phishing domains have a shorter lifetime, typically few hours. Therefore, if the age of the domain is large enough say greater than $A_L$=45 days (predefined age threshold), the domain is considered as safe and the highest score of 1 is assigned to the domain. and (iii) updating the local whitelist with the plurality of domains with the score less than a predefined score threshold, wherein the local whitelist is updated after each browsing. For example the predefined age threshold is $A_L$=45, the predefined visit value threshold is $V_L$=10, the predefined recency value threshold is $R_L$=7 and the typed value is a binary value which is set to 1 if the URL is typed and set to zero, if the URL is clicked.

In an embodiment, the community whitelist is generated as a hash map with domain name as key and a community score as value, by: (i) generating a buffer whitelist by receiving the plurality of domains from the local whitelist (ii) updating the buffer whitelist by computing a community score for each of the plurality of domains in the local whitelist, wherein the community score is computed by: (a) assigning a predefined maximum weight for each domain in the community whitelist when the domain is encountered for the first time (b) updating the corresponding weight of each domain with a predefined minimum weight when the domain name is visited subsequently (iii) generating the community whitelist by selecting a plurality of domains with a predefined community score from the buffer whitelist. The community whitelist is updated whenever the local whitelist is updated.

At step 210 of the method 200, the one or more hardware processors 102 identify whether the hostname of the URL is an Internet Protocol (IP) address when the URL is not the benign URL. The phishing alert is generated when the hostname of the URL is the IP address. For example, instead of "www.xyz.com", if the hostname is "172.268.100.1", then the URL can be a phishing URL.

At step 212 of the method 200, the one or more hardware processors 102 obtain a transition type associated with the URL when the hostname of the URL is other than the IP address. The transition type can be a clicked URL or a typed URL. For example, the typed value is zero if the URL is clicked and the typed value is one if the URL is typed.

At step 214 of the method 200, the one or more hardware processors 102 identify whether the clicked URL is a result of a keyword based search associated with a popular search engine. The URL is allowed to access when the URL is the result of the keyword based search associated with the popular search engine and when the number of search results comprising the clicked URL is greater than a predefined keyword based search result threshold. For example, the predefined keyword based search result threshold can be 10,000 hits.

At step 216 of the method 200, the one or more hardware processors 102 identify whether the clicked URL is having at least one non-ASCII character when the URL is not the result of the keyword based search associated with the popular search engine.

At step 218 of the method 200, the one or more hardware processors 102 analyze the domain pertaining to the clicked URL to identify the IDN (Internationalized Domain Name) homograph attack, when the clicked URL includes at least one non-ASCII character, by: (i) normalizing a plurality of non-ASCII characters associated with the domain based on a Normalization Form Compatibility Decomposition (NFKD), wherein the NFKD decomposes each of a plurality of accented symbols associated with the domain into a Unicode symbol and an acute accent (ii) substituting each of a plurality of Unicode symbols associated with the domain with a corresponding ASCII character based on a confusable map to obtain an ASCII domain. The confusable map provides a mapping between a plurality of the Unicode symbols and a plurality of ASCII symbols (iii) matching the ASCII domain with the plurality of domains associated with each of the plurality of whitelists (iv) generating an IDN attack alarm when the ASCII domain name matches with at least one domain name in each of the plurality of whitelists.

At step 220 of the method 200, the one or more hardware processors 102 identify a popular domain name in the URL by matching the ASCII domain name with a plurality of domain names associated with the global whitelist using a Top Level Domain (TLD) compressed Lex Trie based Deterministic Finite Automaton (DFA) when the clicked URL does not include at least one non-ASCII character. The phishing alert is generated when the popular name is identified in the URL.

From steps 222 to 240, the method 200 identifies a misspelled popular domain name corresponding to the ASCII domain name based on an n-gram based approximate matching algorithm based on a plurality of conditions. The plurality of conditions includes at least one of, the URL does not include any popular domain, the domain of the URL is not prone to IDN homograph attack and the URL is typed.

At step 222 of the method 200, the one or more hardware processors 102 sort each of a plurality of ASCII symbols associated with the ASCII domain name in lexicographic order.

At step 224 of the method 200, the one or more hardware processors 102 divide the plurality of sorted ASCII symbols into a plurality of domain parts based on a predetermined error tolerance value. Each of the plurality of domain parts are of approximately equal size. For example, the error tolerance value (k) is typically k<=2.

At step 226 of the method 200, the one or more hardware processors 102 extract a plurality of trigrams from each of the plurality of domain parts as shown in Table 1.

At step 228 of the method 200, the one or more hardware processors 102 obtain a frequency value for each of the plurality of trigrams corresponding to each of the plurality of domain parts from a frequency dictionary, wherein the frequency dictionary is constructed by: (i) obtaining a plurality of popular domain names from the global whitelist (ii) sorting each of a plurality of symbols corresponding to each of the plurality of popular domain names in lexicographic order (iii) extracting a plurality of trigrams from the plurality of sorted symbols corresponding to each of the plurality of domain names (iv) generating a trigram dictionary based on the extracted trigrams, wherein each row of the trigram dictionary comprises a global whitelist index of a popular domain name, a plurality of sorted symbols corresponding to the popular domain name and a plurality of trigrams corresponding to the popular domain name (v) constructing a frequency dictionary based on the trigram dictionary, wherein each row of the frequency dictionary comprises a trigram, a plurality of trigram dictionary indices associated with the trigram and a frequency value corresponding to the trigram, wherein the frequency value is the number of trigram dictionary indices associated with the trigram.

At step 230 of the method 200, the one or more hardware processors 102 sort each of the plurality of trigrams corresponding to the plurality of domain parts in ascending order based on the corresponding frequency value as shown in Table 1.

At step 232 of the method 200, the one or more hardware processors 102 obtain a plurality of candidate domain names by extracting each domain name pointed by each of the plurality of sorted trigrams based on the corresponding index and the frequency value. A number of candidate domain names pointed by a trigram is equivalent to the corresponding frequency.

At step 234 of the method 200, the one or more hardware processors 102 compute an intersection between each of the plurality of candidate domain names to obtain a plurality of misspelled domain names.

At step 236 of the method 200, the one or more hardware processors 102 compute an edit distance between the plurality of misspelled domain names and the ASCII domain name.

At step 238 of the method 200, the one or more hardware processors 102 obtain the misspelled popular domain name based on the edit distance, wherein the misspelled domain name with an edit distance less than the predetermined edit distance is selected as the misspelled popular domain name. For example, if a length of the domain name is less than or equal to 10, then the edit distance e=1. Otherwise, the edit distance e=2.

At step 240 of the method 200, the one or more hardware processors 102 updating session whitelist with the misspelled popular domain name.

At step 242 of the method 200, the one or more hardware processors 102 compute a phishing probability using logistic regression based on a plurality of features when the domain is not the misspelled popular domain or when the number of search results comprising the clicked URL is greater than the predefined keyword based search result threshold.

In an embodiment, the method of computing the phishing probability using logistic regression comprising the following steps: (i) extracting a plurality of features from the URL. The plurality of features includes a plurality of phishing keywords (ii) computing the phishing probability based on a pre-computed weights associated with each of the plurality of phishing keywords (iii) classifying the URL as phishing URL based on the computed probability. The URL with the probability greater than a predefined probability threshold is classified as phishing URL and (iv) generating the phishing alarm when the probability is greater than the predefined probability threshold.

At step 244 of the method 200, the one or more hardware processors 102 obtain a number of hits by performing a search operation with the URL in a popular search engine when the phishing probability is less than the predefined probability threshold. For example, the predefined probability threshold is p=0.9.

At step 246 of the method 200, the one or more hardware processors 102 classify the URL as phishing URL when the number of hits is less than a predefined hit threshold, wherein the session whitelist is updated if the URL is not a phishing URL.

Figure 3A:
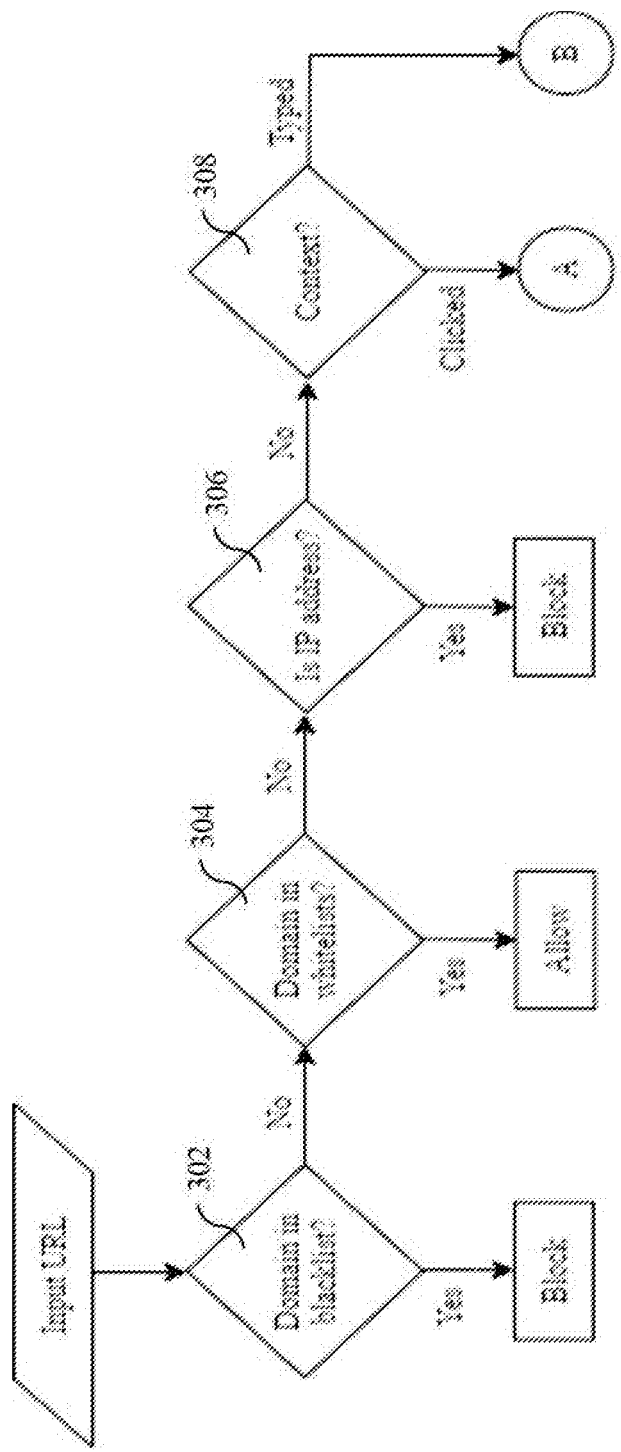
FIGS. 3A to 3C are overall flow diagrams for the method for Layered detection of phishing websites implemented by the system of FIG. 1, in accordance with some embodiments of the present disclosure.
Figure 3B:
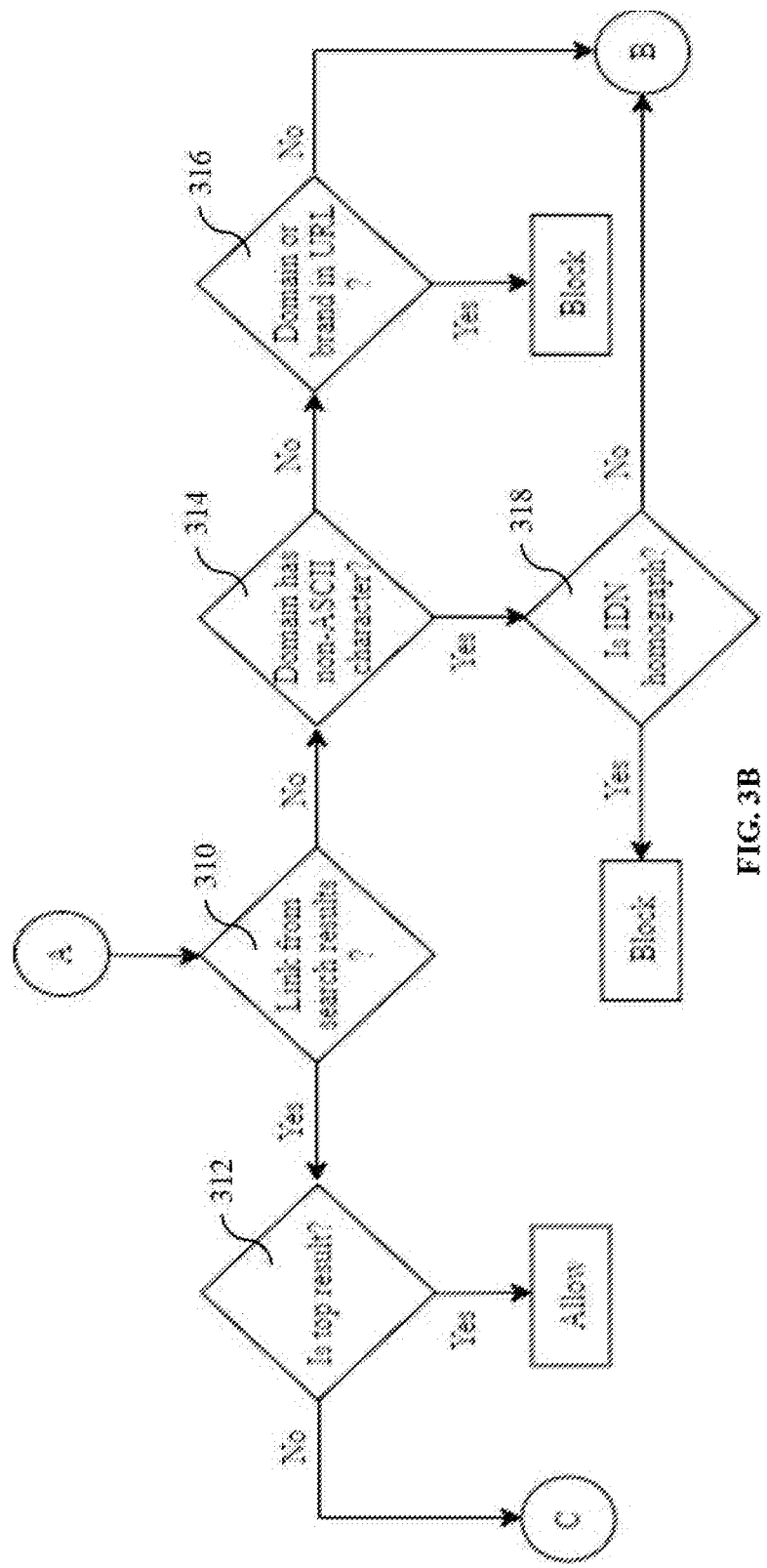
Figure 3C:
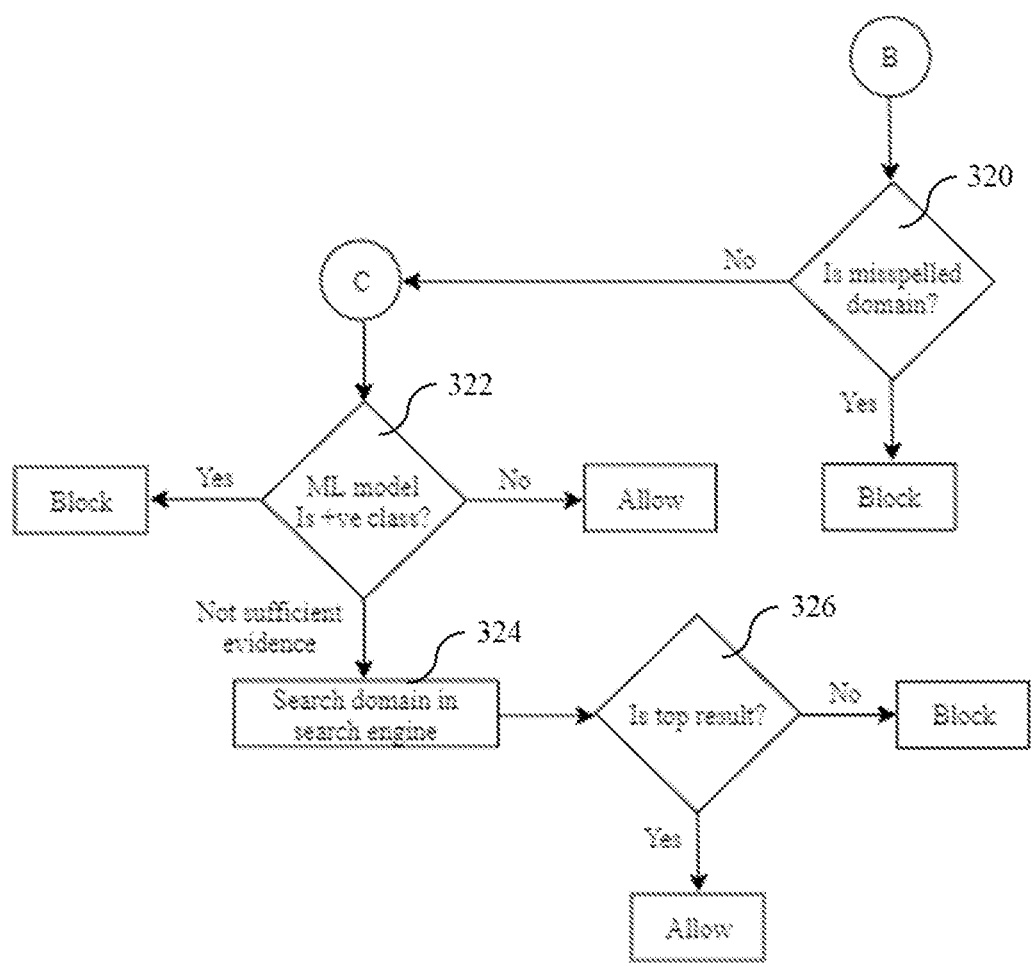

FIGS. 3A to 3C are overall flow diagrams for the method for Layered detection of phishing websites implemented by the system of FIG. 1, in accordance with some embodiments of the present disclosure. Now referring to FIG. 3A to 3C, initially, the method for layered detection of phishing websites initially receives the URL from the browser. A domain name associated with the URL is extracted and compared with the plurality of prohibited domains stored in the blacklist at step 302. A phishing alert is generated and the URL is blocked when there is a match. Further the domain name is compared with the plurality of whitelist domains when there is no match with the blacklisted domains at step 304. The plurality of whitelisted are benign domains. If the domain of the URL matches with at least one domain from the plurality of domains in the plurality of whitelists, the URL is identified as the benign URL. If the domain name does not match with at least one whitelist domain, the hostname of the URL is checked for presence of any Internet Protocol (IP) address at step 304. The phishing alarm is generated when the hostname is an IP address. Further, the context of the URL is checked at step 308 when the hostname is not an IP address. The context can be either typed or clicked. If the context of the URL is clicked, the URL is initially verified whether the URL is the part of any keyword based search in a popular search engine at step 310. If the URL is the result of the keyword based search, the number of search results are obtained and checked whether the number of search results is above the search threshold at step 312. If the number of search results is above the search threshold, the URL is allowed to access. When the URL is not a result of the keyword based search, the domain is checked for any presence of non-ASCII characters at step 314. If non-ASCII characters are present, then an alert is generated for IDN homograph attack at step 318. The IDN attack is a method of deceiving computer users about the remote computer they are communicating. It exploits the fact that many characters/symbols are homograph, i.e., many symbols looks alike. If the URL does not contain any non-ASCII characters, the URL is checked for presence of any brand name or popular domain name at step 316. If brand name is present in the URL, the phishing alert is generated and the URL is blocked. If there is no brand name in the URL, the domain is checked for any misspelling using an n-gram based approach at step 320. If the domain is a misspelling, the phishing alert is generated and the URL is blocked. If the domain is not misspelled, the URL is examined using Machine Learning (ML) model t step 322. If the probability of phishing computed by the ML model is greater than the predefined probability threshold, the phishing alert is generated and the URL is blocked. If the probability of phishing computed by the ML model is less than the predefined probability threshold, the URL is searched in the popular search engine at step 324. The number hits are checked whether it is greater than the hit threshold at step 326. If the number of hits is greater than the predefined hit threshold, the URL is classified as benign and allowed to access. If the number of hits is less than the predefined hit threshold, the URL is blocked and the phishing alert is generated.

The website analysis unit 114, when executed by the one or more processors of the system 100, receives the Uniform Resource Locator (URL) from the browser. The URL includes the protocol name, the hostname and the pathname separated by at least one symbol. The hostname comprises the domain name and the subdomain name. The path name includes the directory name, file name and arguments.

FIG. 4A is an exemplary Uniform Resource Locator (URL) component, in accordance with some embodiments of the present disclosure. Now referring to FIG. 4A, the URL "https://www.qaypal.com/in/webapps/mpp/account-selection?pros=1" includes the protocol name is "https", the hostname is www.qaypal.com and the path name is "/in/ webapps/mpp/account-selection?pros=1". The hostname includes the subdomain "www" and the domain "qaypal.com". The path name includes the directory "in/webapps/mpp", the file name "account-selection" and the arguments "pros=1".

The website analysis unit 114, when executed by the one or more processors of the system 100, extracts the domain name from the hostname of the URL.

The website analysis unit 114, when executed by the one or more processors of the system 100, compares the domain name with the plurality of prohibited domain names stored in the blacklist. The phishing alert is generated when the domain name matches with at least one prohibited domain name stored in the blacklist.

The website analysis unit 114, when executed by the one or more processors of the system 100, compares the domain name with the plurality of popular domain names associated with the plurality of whitelists to check whether the URL is benign when the domain name is not matching with the at least one prohibited domain names stored in the blacklist. The plurality of whitelist includes the local whitelist, the community whitelist, the global whitelist and the session whitelist. The user is allowed to access if the URL is benign.

Figure 4B:
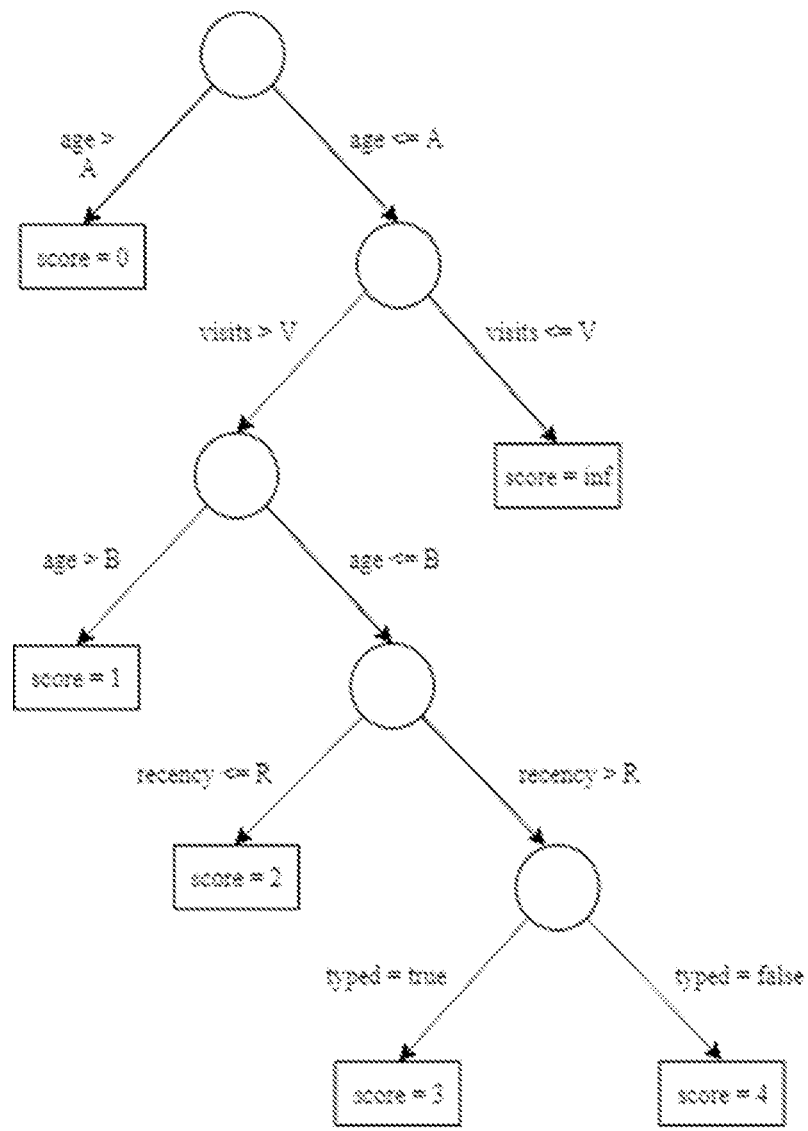
FIG. 4B is a decision tree for generating local whitelist for the method for Layered detection of phishing websites implemented by the system of FIG. 1, in accordance with some embodiments of the present disclosure.

In an embodiment, the local whitelist is generated by the following steps: (i) Initially, a plurality of browsing features associated with each of the plurality of domains are obtained from the browsing history of the user. The plurality of browsing features includes the age value, the visit value, the recency value and the typed value. For example the age threshold is $A_L=45$, the visit value threshold is $V_L=10$, the recency value threshold is $R_L=7$ and the typed value is a binary value which is set to 1 if the URL is typed and set to zero, if the URL is clicked. The age is the difference in time between the recent access to the domain and the oldest access to the domain. The visit value is the number of unique days on which the user visited the domain. The recency value is the time difference between the current time and the recent access time of the domain. The typed value is the Boolean value, set to one if the domain is typed and set to zero if the domain clicked. (ii) Further, the score corresponding to each of the plurality of domains is computed based on the decision tree as shown in FIG. 4B. The decision tree is created by assigning the score for each of the plurality of domains based on the predefined threshold corresponding to each of the plurality of browsing features and (iii) Finally, the local whitelist is updated with the plurality of domains with the score less than the predefined score threshold. The local whitelist is updated after each browsing.

In an embodiment, each domain $d_i$ is associated with four features, $<a_i, v_i, r_i, t_i>$ where $a_i$ is the age of the domain, $v_i$ is the number of unique visits to the domain, $r_i$ is the recency and $t_i$ indicates if the domain is ever typed or not. A scoring function (depicted in FIG. 4B as decision tree) which takes as input the four attributes of the domain $d_i$ and outputs a score $s_i \in \{1, 2, 3, 4, \text{in } f\}$.

FIG. 4B is the decision tree for generating local whitelist for the method for Layered detection of phishing websites, in accordance with some embodiments of the present disclosure. Now referring to FIG. 4B, the score is computed as follows. Most of the phishing domains have a shorter lifetime, typically few hours. Therefore, if the age of the domain is large enough say greater than $A_L=45$ days, the domain is considered as safe and the highest score of 1 is assigned to the domain. If the age is smaller than $A_L$ days, then the number of unique visits are checked. If the domain is visited more than $V_L=10$ different days, the domain is considered as safe and added it to the local whitelist. The intuition is that if the domain is visited by the user frequently, then the website is important for the user and hence, can be considered as safe to visit. However, such domains are assigned with different scores based on the age, the recency and the typed features.

In an embodiment, if the age of the domain is greater than $B_L$ days, the score of 2 is assigned. Otherwise, the domain is checked for visits within past $R_L$ days. If true, it is likely that the user will visit the domain again and hence, the domain is given the score of 3. If the domain has not been visited recently, the domain is checked for at least one instance where the URL containing the domain is typed by the user. The typed URL indicates that the user visited the domain voluntarily and hence, the score of 4 is assigned. Thus, smaller the age of the domain, more stringent is the criteria for placing the domain in the local whitelist. Further, lower the score, more trustworthy is the domain. $A_L, B_L, V_L, R_L$, where $A_L > B_L, > V_L$, are the parameters of the scoring function for creating the local whitelist. In an embodiment, the values of $A_L=45$, $B_L=30$, $V_L=10$ and $R_L=7$.

In an embodiment, the pseudo code for creating the local whitelist is given below:

```
1:    procedure CreateLocalWhitelist
2:    Input: browsing history H of the user
3:    Output: local whitelist W_L for the user
4:        W_L = { }
5:        for d_i ∈ H do
6:            <a_i, v_i, r_i, t_i> = GetDomainFeatures(d_i, H)
7:            /* compute score using decision tree*/
8:            s_i = getDomainScore(a_i, v_i, r_i, t_i)
9:            if s_i ≠ inf then
10:               M[d_i] = s_i
11:           end if
12:       end for
13:       return W_L
14:   end procedure
```

In an embodiment, the pseudo code for updating the local whitelist is given below:

```
16:   Procedure UpdateLocalWhitelist
17:   Input: browsing history H of the user, and local whitelist W_L^prev
      and session whitelist W_S^prev from the previous browsing session
18:   Output: updated local whitelist W_L for the user
19:       W_L = { }
20:       for d_i ∈ W_L^prev ∪ W_S^prev do
21:           if d_i ∈ H then
22:               continue /* do nothing, deletion of old domain */
23:           else
24:               <a_i,v_i, r_i, t_i> = GetDomainFeatures(d_i, H)
25:               /* compute score using decision tree given in Figure 3 */
26:               S_i^new = GetDomainScore(a_i, v_i, r_i, t_i)
27:               if d_i ∈ W_L^prev and d_i ∈ W_S^prev then
28:                   W_L [d_i] = min(S_i^new, W_L^prev [d_i]) /* improve score */
29:               else if d_i ∈ W_L^prev then
30:                   W_L [d_i] = W_L^prev [d_i]) /* retain the existing domain */
31:               else if d_i ∈ W_S^prev then
32:                   W_L [d_i] = min(S_i^new, 8) /*addition of new domain */
33:               end if
34:           end if
35:       end for
36:       return W_L
37:   end procedure
```

In an embodiment, the local whitelist $W_L$ is created immediately after the extension is installed. Every domain $d_i$ in the user's browsing history is assigned a score based on four features (lines 6-8 of the above pseudo code) using decision tree shown in FIG. 3. Domains with score $s_i \in \{1, 2, 3, 4, \text{in } f\}$ are placed in the local whitelist (lines 9-11 of the above pseudo code). At the end of every browsing session, the whitelist is saved locally in the variable $W_L^{prev}$ (using browser.storage API). At the start of every new browsing session, the local whitelist $W_L$ is updated using the local whitelist $W_L^{prev}$ and session whitelist $W_S^{prev}$ from the previous browsing session. If the domain is deleted from the browsing history H, the local whitelist $W_L$ (lines 21-22 of the above pseudo code) is not updated. Thus, the older domain entries are purged from the local whitelist. However, if the domain is present in the browsing history, then the features are extracted and the domain score $S_i^{new}$ is calculated using decision tree of FIG. 3. There are three cases of interest.

Case 1: The domain is present in both the previous local whitelist $W_L^{prev}$ and session whitelist $W_S^{prev}$ which implies that the domain has been visited recently and hence, there is a possibility of improving its score. If the new domain score $S_i^{new}$ is better than the previous score in $W_L^{prev}$, then the result is updated and stored in the updated local whitelist $W_L$ (lines 27-28 of the above pseudo code).

Case 2: The domain is present only in the previous local whitelist $W_L^{prev}$ which case the domain and its score in $W_L^{prev}$ is copied to $W_L$ (lines 29-30 of the above pseudo code). Thus, once the domain enters the local whitelist, it stays there until it is removed from the browsing history. As browsers stores browsing history of past 90 days, if a whitelisted domain is not accessed within last 90 days, it is removed from the browsing history and therefore from $W_L$ (lines 21-22 of the above pseudo code).

Case 3: The domain is present only in the previous session whitelist $W_S^{prev}$, which implies that the domain was either deemed safe to visit or the user chose to ignore the warning given by the system. Such domains are given a maximum score of 8 and added to the updated local whitelist $W_L$ (lines 31-32 of the above pseudo code).

In an embodiment, all domains in the browsing history are not updated in the local whitelist. The local whitelist $W_L$ is implemented using the hash map, with domain $d_i$ as key and score $s_i \in \{1, 2, 3, 4, 8\}$ s as its value. Here, higher score indicates lower trust and hence the domains with lower score are updated in the local whitelist.

In an embodiment, the community whitelist is generated as a hash map with domain name as key and a community score as value, by: (i) generating a buffer whitelist by receiving the plurality of domains from the local whitelist, (ii) updating the buffer whitelist by computing a community score for each of the plurality of domains in the local whitelist, wherein the community score is computed by: (a) assigning a predefined maximum weight for each domain in the community whitelist when the domain is encountered for the first time, (b) updating the corresponding weight of each domain with a predefined minimum weight when the domain name is visited subsequently, and (iii) generating the community whitelist by selecting a plurality of domains with a predefined community score from the buffer whitelist, wherein the community whitelist is updated whenever the local whitelist is updated.

In an embodiment, the pseudo code for generating the community whitelist is given below:

```
1:  procedure CreateCommunityWhitelist
2:  Input: relaxed domain whitelists (W_RL^1, ... W_RL^N) of N users
    and k the size of community whitelist
3:      Output: community whitelist W_C of size k
4:      W_C = { }
5:      for j = 1 to N do
6:          for d_i ∈ W_RL^j do
7:              if d_i ∉ W_C then
8:                  W_C [d_i] = (N − 1) • 16 /* di is seen for the first time */
9:              else
10:                 W_C [d_i] = W_C [d_i] − 16 /* nullify the penalty */
11:             end if
12:             W_C [d_i] += W_RL^j [d_i]
13:         end for
14:     end for
15:     sort domains in W_C in the increasing order of the score
16:     return top k entries
17: end procedure
```

In an embodiment, the community whitelist is generated as explained below: The local whitelist $W_{RL}^j$ of each user $U^j$ can be combined to create a more effective whitelist for the whole community. For instance, if the users are employees of an organization, their local whitelists can be transmitted to an internal server for creating a more elaborate and reliable whitelist for the entire organization. It is noted that the local whitelist is created using a strict criteria as defined by the parameters $A_L=45$, $B_L=30$ and $V_L=10$ of the scoring function (FIG. 3). For creating community whitelist, the criteria is relaxed ($A_C=A_L-2$, $B_C=B_L-2$ and $V_C=V_L-2$) and create a new relaxed local whitelist $W_{RL}^j$ locally from the browsing history $H^j$ of each user $U^j$. Further the relaxed whitelist $W_{RL}^j$ is updated whenever the local whitelist $W_{RL}^j$ is updated. Thus, $W_L^j \subset W_{RL}^j \subset H^j$. The relaxed whitelist $W_{RL}^j$ consisting of domain and score as key value pairs is transmitted to the server. The complete URL or any of its attributes are not sent (e.g., exact age or frequency) due to privacy concerns.

The community whitelist $W_C$ is implemented as a hash map, with domain $d_i$ as key and community score $W_C[d_i]$ as value. Initially, the community whitelist is empty (line 4) and iterated over relaxed whitelists ($W_{RL}^1$, ... $W_{RL}^N$) received from N users and compute the community score $W_C[d_i]$ for each domain $d_i$. If the domain $d_i$ is encountered for the first time i.e., it is not present in the community whitelist, then the corresponding community score $W_C[d_i]$ is penalized with 16 for each of the remaining N−1 users (lines 7-8 of the above pseudo code). If the domain is already present in the community whitelist, the penalty of 16 is nullified from its community score $W_C[d_i]$ for the current user $U^j$ (lines 9-10 of the above pseudo code). Subsequently, the community score $W_C[d_i]$ is updated using the score in the relaxed local whitelist $W_{RL}^j$ (line 12 of the above pseudo code).

The maximum score of a domain in a relaxed whitelist is 8. Further, the community score of a domain is increased by 16 if it is not present in the relaxed whitelist of a given user. Thus, a smaller community score indicates that the domain is popular and visited frequently by the community, whereas a larger score indicates that the domain is less popular and is visited infrequently. Therefore, smaller the score, the more popular is the website domain. Top k domain entries with the smallest community scores are selected and returned to form a community whitelist (lines 15-16). The creation of community whitelist requires up to date local whitelists from each participant. Therefore, one may create community whitelist periodically, for instance once in a week.

In an embodiment, the global whitelist includes the plurality of popular domains across the globe. The global whitelist is obtained from Tranco-list. The Tranco-list includes the domain lists from four different providers: Alexa, Cisco Umbrella, Majestic and Quantcast, using an improved ranking function which is more robust and resistant to adversarial manipulation. The Tranco-list includes top one million domains obtained by aggregating all four rankings averaged over the past 30 days. The present disclosure utilized the first 50,000 domains from tranco-list as global whitelist.

In an embodiment, the session whitelist includes the plurality of domains visited in the current browsing session that are determined to be safe for visit. The session whitelist is implemented as the hash map, with domain $d_i$ as key and true as value. At the start of the browsing session, the session whitelist $W_S$ is empty (line 4 in the pseudo code InitializeWhitelists given below). If the user visits a domain which is either in local whitelist, community whitelist or global whitelist, the corresponding domain is added to the session whitelist. Further, if the user queries a search engine and visits any website from the top search engines results, the domain is deemed to be safe and added to the session whitelist for later use. If the user visits the domain again in the same browsing session, it will be found in the session whitelist. Hence, session whitelist serves as a fast cache for future lookups of the recently visited domains. At the end of browsing session, the session and local whitelists are stored locally using the browser.storage API. They are retrieved in the next browsing session for updating the local whitelist $W_L$ (lines 9-11).

In an embodiment, the pseudo code for initializing the plurality of whitelists is given below:

```
1:    procedure InitializeWhitelists
2:    Input: browsing history H of the user
3:    Output: session W_S, local W_L, community W_C and global W_G
      whitelists
4:        W_S = { }
5:        H = GetBrowsingHistory( )
6:        if W_L is not created then
7:            W_L = CreateLocalWhitelist(H)
8:        else
9:            W_S^prev = LoadPrevSessionWhitelist( )
10:           W_L^prev = LoadPrevLocalWhitelist( )
11:           UpdateLocalWhitelist(H, W_L^prev, W_S^prev)
12:       end if
13:       W_C = LoadCommunityWhitelist( )
14:       W_G = LoadGlobalWhitelist( )
15:   end procedure
```

In an embodiment, the pseudo code to check the domain name in the plurality of whitelists is given below:

```
17:   procedure CheckInWhitelist
18:   Input: domain d requested by the user
19:   Output: Boolean value indicating if the domain d is present in
      one of the whitelists and updated session whitelist W_S
20:       if d ∈ W_S then
21:           return true
22:       else if d ∈ W_L then
23:           W_S [d] = true
24:           return true
25:       else if d ∈ W_C then
26:           W_S [d] = true
27:           return true
28:       else if d ∈ W_G then
29:           W_S [d] = true
30:           return true
31:       else if d appears in the top search engine results then
32:           W_S [d] = true
33:           return true
34:       else
35:           return false
36:       end if
37:   end procedure
38:   /* domain is also added to the session whitelist if it is classified
      as safe by other components of PhishMatch */
```

In an embodiment, the method of checking the domain name in the plurality of whitelists is given below: If the domain name is not found in the blacklist, it is first checked in the session whitelist $W_S$. If it is present, then the request is allowed (lines 20-21 of the above pseudo code) and the requested web page is fetched. Otherwise, the domain is checked in the local whitelist $W_L$ (lines 22-24 of the above pseudo code) followed by the community whitelist $W_C$ (lines 25-27 of the above pseudo code) and finally in the global whitelist $W_G$ (lines 28-30 of the above pseudo code). If the domain is found in any of these 3 whitelists, it is added to the session whitelist and the request is allowed. If the domain is not found in any whitelists, the system checks if the URL is clicked from the top search engine results. If that is the case, then the domain is added to the session whitelist and the request is allowed (lines 31-33 of the above pseudo code).

The website analysis unit 114, when executed by the one or more processors of the system 100, identifies whether the hostname of the URL is the IP address when the URL is not the benign URL. The phishing alert is generated when the hostname of the URL is the IP address.

IP address is represented in either hexadecimal or the usual dot decimal notation. In an embodiment, all IP addresses are not unsafe. This is especially true in the development and testing environment where developers work on machines setup on the internal network. If an IP address is visited frequently over a period of time, it is eventually added to the local whitelist and all future web requests to it will be allowed. Alternatively, organizations can proactively whitelist a list of IP addresses to enable access to server machines on their internal network.

The website analysis unit 114, when executed by the one or more processors of the system 100, obtains a transition type associated with the URL when the hostname of the URL is other than the IP address. The transition type comprises one of, a clicked URL and a typed URL. Here, "initiator" and "tabId" fields of a web request object are used for identifying the context. The "initiator" indicates the origin where the request was initiated and "tabId" indicates the ID of the tab in which the request takes place.

The website analysis unit 114, when executed by the one or more processors of the system 100, identifies whether the clicked URL is the result of the keyword based search associated with the popular search engine. The URL is allowed to access when the URL is the result of the keyword based search associated with the popular search engine and when the number of search results comprising the clicked URL is greater than the predefined keyword based search result threshold The website analysis unit 114, when executed by the one or more processors of the system 100, identifies whether the clicked URL is having at least one non-ASCII character when the URL is not the result of the keyword based search associated with the popular search engine. For example, it is observed that, users rely on search engines to find information about specific websites on the internet. Popular search engines like "Google® Search" detect phishing web pages during crawling phase and avoid indexing them. Hence, the search engine results can be trusted and only those searches that retrieve a large number of search results, say more than 10,000 can be trusted. Therefore, if the number of results returned by the search engine is greater than a pre-defined threshold (10,000), the script stores all received URLs in a hash map against senders "tabId" as key. If the requested URL is found in the hash map, that implies the URL is clicked from the search result page and hence, can be considered as safe to visit.

The website analysis unit 114, when executed by the one or more processors of the system 100, analyzes the domain pertaining to the clicked URL to identify the IDN (Internationalized Domain Name) homograph attack, when the clicked URL includes at least one non-ASCII character, by: (i) normalizing a plurality of non-ASCII characters associated with the domain based on a Normalization Form Compatibility Decomposition (NFKD), wherein the NFKD decomposes each of a plurality of accented symbols associated with the domain into a Unicode symbol and an acute accent (ii) substituting each of a plurality of Unicode symbols associated with the domain with a corresponding ASCII character based on the confusable map to obtain an ASCII domain. The confusable map provides the mapping between the plurality of the Unicode symbols and the plurality of ASCII symbols (iii) matching the ASCII domain with the plurality of domains associated with each of the plurality of whitelists (iv) generating an IDN attack alarm when the ASCII domain name matches with at least one domain name in each of the plurality of whitelists The website analysis unit 114, when executed by the one or more processors of the system 100, identifies the popular domain name in the URL by matching the ASCII domain name with the plurality of domain names associated with the global whitelist using the Top Level Domain (TLD) compressed Lex Trie based Deterministic Finite Automaton (DFA) when the clicked URL does not include at least one non-ASCII character. The phishing alert is generated when the popular name is identified in the URL.

In an embodiment, the TLD compressed Lex Trie based DFA is a state compressed DFA constructed from a Lex Trie. Initially, the plurality of popular domain names are sorted based on the lexicographic order. Further, the Lex Trie is constructed using the plurality of sorted popular domains names. The Lex Trie is a tree data structure including a plurality of nodes and a plurality of directed edges. The plurality of nodes comprises at least one parent node and a plurality of child nodes. Each of the plurality of nodes is associated with the node number, wherein the node with the least node number is the start node. Each directed edge from the plurality of edges is associated with the transition between the pair of nodes from the plurality of nodes. The pair of nodes includes the parent node and the child node. For example, if (u,v) is a directed edge from a node u to node v from the plurality of nodes, then node u is a parent node and node v is a child node. The plurality of child nodes of a parent node are numbered consecutively in the Lex Trie and this feature is utilized to construct an optimized Lex Trie based DFA. The Lex Trie is further converted into the DFA by including failure pointers and ending nodes as shown in FIG. 5A.

Figure 5A:
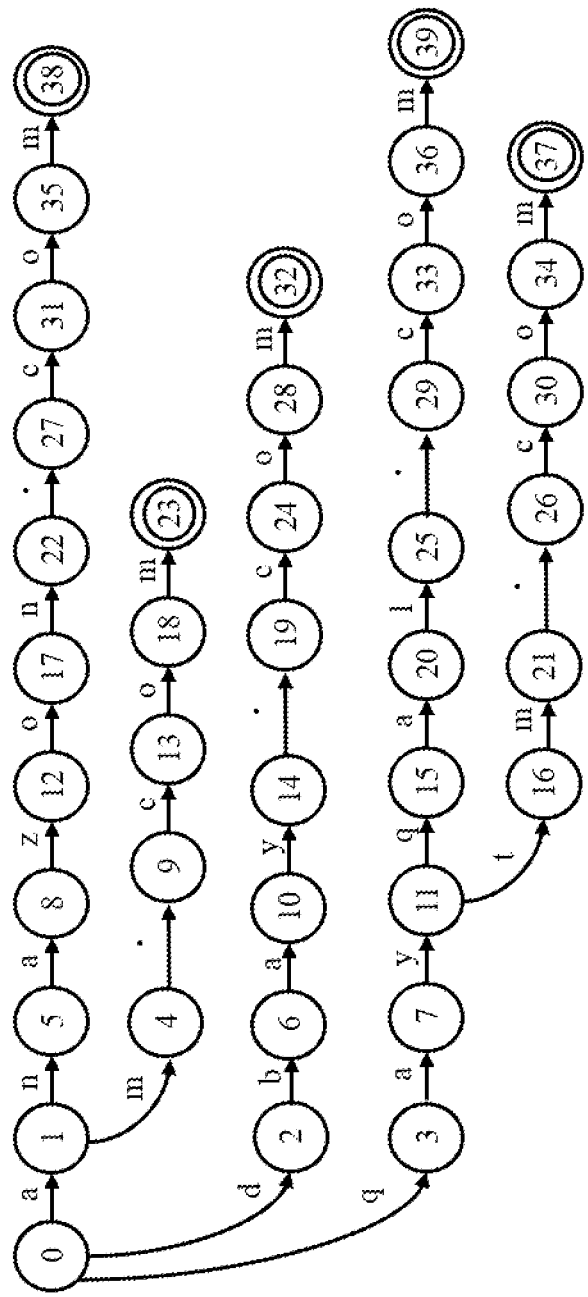
FIG. 5A is an exemplary Lex Trie based Deterministic Finite Automaton (DFA) for storing popular domains for the method for Layered detection of phishing websites, in accordance with some embodiments of the present disclosure.

FIG. 5A is an exemplary Lex Trie based Deterministic Finite Automaton (DFA) for storing popular domains for the method for Layered detection of phishing websites, in accordance with some embodiments of the present disclosure.

Now referring to FIG. 5A, the double circled nodes are the ending nodes and the node 0 is the start node. A plurality of popular domain names compiled in the Lex Trie based DFA as shown in FIG. 5A are {anazon.com, am.com, dbay.com, qayqal.com, qaytm.com}. Here, a bit map array is allocated for each of the plurality of nodes with more than one child. The bit map array includes a plurality of bit positions corresponding to each of the plurality of symbols associated with each of the plurality of popular domain names. A bit set to one corresponds to a valid transition and a bit set to zero corresponds to an invalid transition. A transition value is computed as follows: The plurality of nodes with one child is assigned with a next child value as the transition value. The transition value for each of the plurality of nodes with more than one child are computed based on a smallest next child and the corresponding bit map. A bit position corresponding to an input symbol from the bit map array associated with a current node is obtained. An offset is computed by counting the number of bits set to one till the bit position of the current input symbol in the corresponding bit map array of the current node. The transition value is computed by adding the offset with the smallest next value associated with the current node. Further, the current node is updated by swapping the current node with the transition value and the current input symbol is updated by swapping the current input symbol with the next symbol of the current input symbol.

Figure 5B:
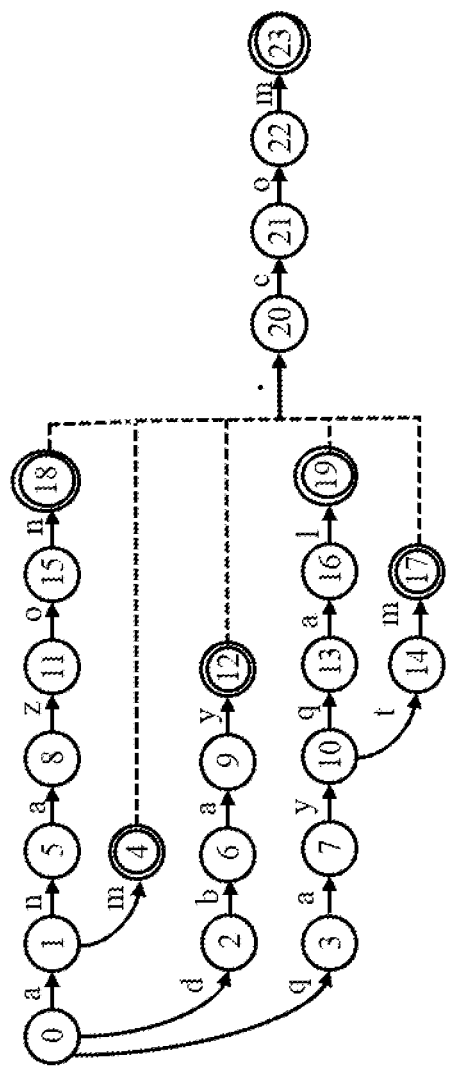
FIG. 5B is an exemplary Top Level Domain (TLD) compressed Lex Trie based Deterministic Finite Automaton (DFA) for storing popular domains for the method for Layered detection of phishing websites, in accordance with some embodiments of the present disclosure.

Further, the Lex Trie based DFA is TLD compressed, wherein the TLD (for example, ".com") is common for a plurality of domain names and are compressed to reduce the number of states as shown in FIG. 5B.

FIG. 5B is an exemplary Top Level Domain (TLD) compressed Lex Trie based Deterministic Finite Automaton (DFA) for storing popular domains for the method for Layered detection of phishing websites, in accordance with some embodiments of the present disclosure.

Now referring to FIG. 5B, consider the input text as "am.com". The first input symbol is 'a' and it matches with a symbol of the node 0. The bit map array associated with the node 0 with the out degree 3 is "00000000000100100000000000001" which indicates that the node 0 is having valid transition only for the bit positions set to 1. Hence, the node 0 is having valid transition only for the symbols 'a', 'd' and 'q' since the corresponding bit positions are set to 1. The smallest next value for the node 0 is 1. The number of bits set to one before the bit position of symbol 'a' is zero. Hence the offset is zero and the transition value from node 0 is computed as 0+1 (offset+ smallest next)=1. Hence the transition value from node 0 is node 1. The node 1 is having 2 children. The bit map associated with node 1 is "0000000000000000000000011000". Now the next input symbol is 'm' and is matched with the input symbol of node 1. The number of ones before the bit position of the symbol 'm' is zero. Hence the offset is 0 and the smallest next value for the node 1 is 4. Hence the transition value is 4 (0+4). The next symbol is '.' and the '.' matches with the symbol of the node 4. Since the node 4 is having only one child, the transition value is the child node of node 4, which is node 20. Similarly, the symbol 'c', 'o' and 'm' are matched using the TLD compressed Lex Trie based DFA.

Figure 6:
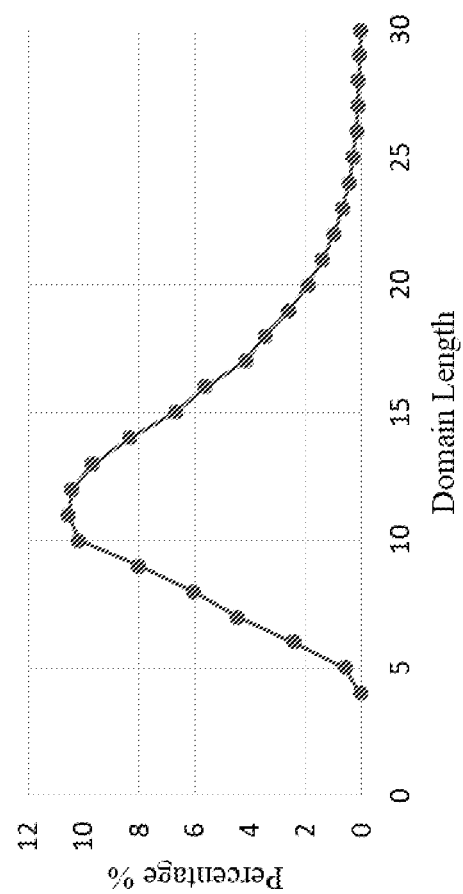
FIG. 6 is a graph illustrating distribution of length of domains in global whitelist for the method for Layered detection of phishing websites, in accordance with some embodiments of the present disclosure.

In an embodiment, it is observed that most of the domains in the global whitelist have length between 6 to 20 as shown in FIG. 6. For example, if the input domain d has length 12, then it needs to be compared with ~50% of the global whitelist for similarity (around 25,000 popular domains are of length 10, 11, 12, 13 and 14) which is inefficient. To find if the input domain is the misspelling of some popular domain more efficiently, the present disclosure presents the n-gram based technique. If the Damerau-Levenshtein distance between the misspelled domain d and the popular target domain p is e≤2, it is observed that if the misspelled domain d is divided into e+1 nearly equal parts, then for all edit operations except swap, by pigeonhole principle, at least one part of the string (and the corresponding n-grams) will be free from error which can be used to deduce the actual domain p the user intended to type (visit).

The website analysis unit 114, when executed by the one or more processors of the system 100, identifies the misspelled popular domain name corresponding to the ASCII domain name based on the n-gram based approximate matching algorithm based on the plurality of conditions. The plurality of conditions includes at least one of, the URL does not include any popular domain, the domain of the URL is not prone to IDN homograph attack and the URL is typed, by: (i) sorting each of the plurality of ASCII symbols associated with the ASCII domain in lexicographic order, when the URL does not include any popular domain, the domain of the URL is not prone to IDN homograph attack and the URL is typed, (ii) dividing the plurality of sorted ASCII symbols into the plurality of domain parts based on the predetermined error tolerance value. Each of the plurality of domain parts are of approximately equal size, (iii) extracts the plurality of trigrams from each of the plurality of domain parts, and (iv) obtaining the frequency value for each of the plurality of trigrams corresponding to each of the plurality of domain parts from the frequency dictionary. The frequency dictionary is constructed by: (a) obtaining the plurality of popular domain names from the global whitelist, (b) sorting each of the plurality of symbols corresponding to each of the plurality of popular domain names in lexicographic order, (c) extracting the plurality of trigrams from the plurality of sorted symbols corresponding to each of the plurality of domain names, (d) generating the trigram dictionary based on the extracted trigrams. Each row of the trigram dictionary includes the global whitelist index of the popular domain name, the plurality of sorted symbols corresponding to the popular domain name and the plurality of trigrams corresponding to the popular domain name, and (e) constructing the frequency dictionary based on the trigram dictionary. Each row of the frequency dictionary comprises the trigram, the plurality of trigram dictionary indices associated with the trigram and the frequency value corresponding to the trigram. The frequency value is the number of trigram dictionary indices associated with the trigram, (v) sorting each of the plurality of trigrams corresponding to the plurality of domain parts in ascending order based on the corresponding frequency value, (vi) obtaining the plurality of candidate domain names by extracting each domain name pointed by each of the plurality of sorted trigrams based on the corresponding index and the frequency value. A number of candidate domain names pointed by the trigram is equivalent to the corresponding frequency, (vii) computing the intersection between each of the plurality of candidate domain names to obtain the plurality of misspelled domain names (viii) computes the edit distance between the plurality of misspelled domain names and the ASCII domain name, (ix) obtaining the misspelled popular domain name based on the edit distance, wherein the misspelled domain name with an edit distance less than the predetermined edit distance is selected as the misspelled popular domain name, and (x) updating session whitelist with the misspelled popular domain name.

Typosquatting attack targets longer domains as most of the short domains are already in use. Further, the probability of making spelling mistakes increases with the domain length. Therefore, the present disclosure checks whether the input domain d of length l is within distance one of the shorter popular domains (length 10) or within distance two of the longer popular domains (length >10). A simple technique to find the candidate popular domains is as follows:

1) First, only those domains in the global whitelist that have length l' such that l−e≤l'≤+e are retained, where l is the length of the input domain d and e≤2 is a tolerance error. The resulting filtered set is $D_L$.
2) Second, the shortlisted domains $D_L$ are filtered by unigrams, as the number of distinct characters between the input domain d and a popular domain cannot be more than e. The resulting filtered set is $D_U$
3) Finally, Damerau-Levenshtein distance between the input domain d and each domain in the filtered set $D_U$ is computed and return domains within distance e of d.

FIG. 6 is a graph illustrating distribution of length of domains in global whitelist for the method for Layered detection of phishing websites, in accordance with some embodiments of the present disclosure.

In an embodiment, the pseudo code for identifying the misspelled popular domain is given below:

```
 1: procedure Preprocessing
 2: Input: list of domains D
 3: Output: dictionary L with length as key and subset of indices in D as value,
    dictionary T with trigram as key and subset of indices in D as value, and
    dictionary F with trigram as key and its frequency count in D as value
 4:    T = { }
 5:    L = { }
 6:    F = { }
 7:    for i = 0 toD. length − 1 do
 8:        l = D[i].length
 9:        if l ∈ L then
10:            L[l] = L[l].concat(i)
11:        else
12:            L[l] = [i]
13:        end if
14:        if l < 6 or l > 20 then
15:            continue
16:        end if
17:        d = sort(D[i])
18:        trigrams = ExtractT rigrams(d)
19:        for t ∈ trigrams do
20:            if t ∈ T then
21:                T[t] = T[t].concat(i)
22:                F[t]+ = 1
23:            else
24:                T[t] = [i]
```

```
25:        F[t] = 1
26:      end if
27:    end for
28:  end for
29: return T, L, F
30: end procedure
32: procedure Matching
33: Input: input domain d, list of domains D, trigram dictionary T, frequency
dictionary F and length dictionary L
34: Output: candidate popular domains similar to domain d
35:   l = d.length
36:   if l < 6 then
37:     e = 1
38:     return BasicFilter(d, e, D, L)
39:   else if l ≤ 10 then
40:     e = 1
41:     $D_T$ = NgramFilter(d, e, D, T, F)
42:     return BasicFilter(d, e, $D_T$, L)
43:   else if l ≤ 20 then
44:     e = 2
45:     $D_T$ = NgramFilter(d, e, D, T, F)
46:     return BasicFilter(d, e, $D_T$, L)
47:   else
48:     e = 2
49:     return BasicFilter(d, e, D, L)
50:   end if
51: end procedure
53: procedure NgramFilter
54: Input: input domain d, error e, list of domains D, trigram dictionary T
and frequency dictionary F
55: Output: candidate popular domains within distance e of domain d
56:   d = sort(d)
57:   Split domain d into e + 1 equal parts $d_1, d_2 \ldots \ldots d_{e+1}$
58:   DT = new Set( )
59:   for q = 1 to e + 1 do
60:     trigrams = ExtractT rigrams($d_q$)
61:     s = use dict F to sort trigrams in increasing order of frequency
62:     indices = T[s[0]] ∩ T[s[1]] ∩ …. T[s[s.length − 1]]
63:     $D_T$ = $D_T$ ∪ D[indices]
64:   end for
65: return Array.from($D_T$)
66: end procedure
68: procedure BasicFilter
69: Input: input domain d, error e, list of domains D and length dictionary L
70: Output: candidate popular domains within distance e of domain d
71:   l = d.length
72:   /* filter D by length */
73:   $D_L$ = retain domains in D with length l′ such that l − e ≤ l′ ≤ l + e
74:   /* filter $D_L$ using unigrams */
75:   $D_U$ = retain domains in $D_L$ having at most e distinct characters from d
76:   Compute Damerau-Levenshtein distance between d and domains in $D_U$
77:   Return domains in $D_U$ with distance at most e
78: end procedure
```

In an embodiment, the n-gram based approximate matching algorithm is explained with an example: Consider the plurality of popular domains D=[anazom.com, am.com, dbay.com, qaypal.com, qaytm.com]. In the pre-processing step (lines 1-30), each of the plurality of popular domains are sorted and the plurality of trigrams are extracted as shown in Table 1. The plurality of trigrams are utilized to create dictionary as shown in Table 2. The dictionary shown in Table 2 stores trigram t along with the indices of domains in D containing the trigram t and the trigram frequency F[t] which indicates the number of domains in D that contain the trigram t. Suppose that the typed domain is d=qaypai.com. Since the length of the input domain is 10, the present disclosure aims in finding popular domains in D that lie within distance e=1 of d (lines 39-40 of the above pseudo code). Further the procedure n-gramFilter is utilized to determine the potential similar candidates in D using trigrams in the input domain d (line 41). First, qaypai.com is sorted which gives .aacimopqy (line 56). As e=1, d is divided into two equal parts .aaci and mopqy (line 57). The trigrams in the first part are .aa, aac and aci (line 60). Their frequency in the dictionary T is 3, 2 and 0 respectively (Table 4). The domains in D that contain all trigrams of .aaci is obtained. For this, the trigrams are sorted in the increasing order of their frequency (line 61 of the above pseudo code). As the frequency of the trigram aci is 0, hence there is no domain in the list D containing the trigram aci. Hence, the set $D_T$ of candidate domains for the first part .aaci is empty (line 63 of the above pseudo code).

The trigrams in the second part mopqy are mop, opq and pqy (line 60). Their frequency in the dictionary F is 2, 1 and 1 respectively (Table 2). Further, the domains that contain all trigrams of mopqy are obtained. Therefore, the trigrams are sorted by increasing frequency (line 61). The least frequent trigrams opq and pqy are present in only one domain qaypal.com (stored at index 5 in D), whereas the trigram mop is present in two domains qaypal.com and qaytm.com (stored at indices 5 and 6 in D). Hence, the result of their intersection is qaypal.com. Therefore, the resulting set $D_T$ contains only one candidate domain qaypal.com (line 63).

Further, the procedure BasicFilter is called which further filters the set $D_T$ by length and unigrams (line 42). As the set $D_T$ contains only one domain having the same length as the input domain d and differs only in one character from d, the set $D_T$ is copied as is to $D_U$ (line 72-75). Finally, the Damerau-Levenshtein distance between the input domain qaypai.com and the candidate domain qaypal.com is computed in $D_U$ (line 76 of the above pseudo code). As the edit distance is 1, the set $D_U$ containing the string qaypal.com is returned (line 77 of the above pseudo code).

TABLE 1

| i | Domain D [i] | Sorted | Trigrams |
|---|---|---|---|
| 0 | anazom.com | aacmnnooz | {.aa, aac, acm, cmn, mnn, nno, noo, ooz} |
| 1 | am.com | .acmmo | {.ac, acm, cmm, mmo} |
| 2 | dbay.com | .abcdomy | {.ab, abc, bcd, cdo, dom, omy} |
| 3 | qaypal.com | .aaclmopqy | {.aa, aac, acl, clm, lmo, mop, opq, pqy} |
| 4 | qaytm.com | .acmmoqty | {.ac, acm, cmm, mmo, moq, oqt, qty} |

TABLE 2

| Trigram T | Domain index list T [t] | Frequency F [t] |
|---|---|---|
| .aa | [0, 1, 5] | 3 |
| aac | [0, 5] | 2 |
| acm | [0, 6] | 2 |
| cmn | [0, 6] | 2 |
| mnn | [0] | 1 |
| nno | [0, 1] | 2 |
| noo | [0] | 1 |

The website analysis unit 114, when executed by the one or more processors of the system 100, computes the phishing probability using logistic regression based on the plurality of features when the domain is not the misspelled popular domain or when the number of search results comprising the clicked URL is greater than the predefined keyword based search result threshold.

In an embodiment, the method of computing the phishing probability using logistic regression comprising the following steps: (i) extracting the plurality of features from the URL. The plurality of features includes the plurality of phishing keywords, (ii) computing the phishing probability based on the pre-computed weights associated with each of the plurality of phishing keywords, (iii) classifying the URL as phishing URL based on the computed probability, wherein the URL with the probability greater than the predefined probability threshold is classified as phishing URL, and (iv) generating the phishing alarm when the probability is greater than the predefined probability threshold.

The logistic regression model is effective, computationally efficient and consumes less memory as compared to more advanced techniques such as neural networks, which makes it suitable for deployment at client-side. The logistic regression model predicts the probability of a positive class, given a feature vector x as given in equation 1.

$$P(y = 1 | x; \theta, b) = \sigma(\theta^T + b) = \frac{1}{1 + \exp^{-(\theta^T x + b)}} \quad (1)$$

where, $\theta \in R^n$ and bias b are the parameters (weights) of the logistic regression model, and $\sigma(\cdot)$ is the sigmoid function defined as $$\sigma(z) = \frac{1}{1 + \exp^{-(\theta^T x + b)}}.$$

The output of the sigmoid function $\sigma(\cdot)$ is interpreted as the probability that the example belongs to positive class. The parameters $\theta$ and bias b are estimated by minimizing the loss function $L(\theta, b)$ using a gradient descent algorithm. The loss function is given in equation 2.

$$L(\theta, b) = \Sigma_{i=1}^{m} \log p(y_i | x_i) + \lambda \Sigma_{j=1}^{n} |\theta_j| \quad (2)$$

In an embodiment, the logistic regression model is trained and tested as follows: The dataset consisting of 300,000 URLs is divided into 240,000 training URLs (80%) and 60,000 test URLs (20%). SBoW and numerical features are extracted from the training set, and a logistic regression model is trained to learn the association between these features and two categories of URLs (phish and benign). Subsequently, the category of test URLs is predicted using the trained model. The misclassification rate (MCR) and false negative rate (FNR) of the classifier are 5.42% and 3.23% respectively. MCR measures the fraction of URLs classified incorrectly, whereas false negative rate (FNR) measures the fraction of phishing instances that are incorrectly detected as benign. Specifically, $$MCR = \frac{FN + FP}{TP + FN + TN + TP} \quad (3)$$

$$FNR = \frac{FN}{TP + FN} \quad (4)$$

where TP (true positives) is the number of phishing URLs correctly detected as phishing, TN (true negatives) is the number of benign URLs correctly detected as benign, FN (false negatives) is the number of phishing URLs incorrectly detected as benign and FP (false positives) is the number of benign URLs incorrectly detected as phishing.

The website analysis unit 114, when executed by the one or more processors of the system 100, obtains the number of hits by performing the search operation with the URL in the popular search engine when the phishing probability is less than the predefined probability threshold.

The website analysis unit 114, when executed by the one or more processors of the system 100, classifies the URL as phishing URL when the number of hits is less than the predefined hit threshold, wherein the session whitelist is updated if the URL is not a phishing URL.

The method and system of the present disclosure are experimented as follows: In an embodiment, the browsing history from 33 browser users were collected. With user's consent, the browsing history and Visit tables from the browser were extracted. The URLs visited by users are evaluated by a plurality of popular anti-phishing softwares at the proxy server. To evaluate the effectiveness of the present disclosure, around 18,000 unique new confirmed phishes were crawled from PhishTank repository. Further, different phishing models were trained and their performance were compared against the present approach. The accuracy and efficiency of the present disclosure is better than the conventional methods.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of efficient and accurate detection of phishing websites using the layered approach. The present disclosure includes the plurality of whitelists like local whitelist, session whitelist, community whitelist and global whitelist which increases the accuracy of the system. Further, the present disclosure utilizes the TLD compressed Lex Trie based DFA for matching the popular domains which increases the efficiency of the system. Further, the n-gram based approximate matching algorithm and the regression model of the present disclosure increases the accuracy of the system.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs, GPUs and edge computing devices.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e. non-transitory. Examples include random access memory (RAM), read-only memory (ROM), volatile memory, non-volatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method, the method comprising:
   receiving, by one or more hardware processors, a Uniform Resource Locator (URL) from a browser, wherein the URL comprises a protocol name, a hostname and a pathname separated by at least one symbol, and wherein the hostname comprises a domain name and a subdomain name;
   extracting, by the one or more hardware processors, the domain name from the hostname of the URL;
   comparing, by the one or more hardware processors, the domain name with a plurality of prohibited domain names stored in a blacklist, wherein a phishing alert is generated when the domain name matches with at least one prohibited domain name stored in the blacklist;
   comparing, by the one or more hardware processors, the domain name with a plurality of popular domain names associated with a plurality of whitelists to check whether the URL is benign when the domain name is not matching with the at least one prohibited domain names stored in the blacklist,
      wherein the plurality of whitelists comprises a local whitelist, a community whitelist, a global whitelist and a session whitelist, and
      wherein a user is allowed to access if the URL is benign;
   identifying, by the one or more hardware processors, whether the hostname of the URL is an Internet Protocol (IP) address when the URL is not the benign URL, wherein the phishing alert is generated when the hostname of the URL is the IP address;
   obtaining, by the one or more hardware processors, a transition type associated with the URL when the hostname of the URL is other than the IP address, wherein the transition type comprises one of, a clicked URL and a typed URL;

analyzing, by the one or more hardware processors, the URL when the transition type of the URL is clicked, by:

identifying whether the clicked URL is a result of a keyword based search associated with a popular search engine, wherein the URL is allowed to access when the URL is the result of the keyword based search associated with the popular search engine and when the number of search results comprising the clicked URL is greater than a predefined keyword based search result threshold;

identifying whether the clicked URL is having at least one non-American Standard Code for Information Interchange (ASCII) character when the URL is not the result of the keyword based search associated with the popular search engine;

analyzing the domain pertaining to the clicked URL to identify an Internationalized Domain Name (IDN) homograph attack, when the clicked URL includes at least one non-ASCII character, by:

normalizing a plurality of non-ASCII characters associated with the domain based on a Normalization Form Compatibility Decomposition (NFKD), wherein the NFKD decomposes each of a plurality of accented symbols associated with the domain into a Unicode symbol and an acute accent;

substituting each of a plurality of Unicode symbols associated with the domain with a corresponding ASCII character based on a confusable map to obtain an ASCII domain, wherein the confusable map provides a mapping between a plurality of the Unicode symbols and a plurality of ASCII symbols;

comparing the ASCII domain with a plurality of domains associated with each of the plurality of whitelists; and generating an IDN attack alarm when the ASCII domain matches with at least one domain name in each of the plurality of whitelists; and identifying a popular domain name in the URL by matching an ASCII domain name in the URL with a plurality of domain names associated with the global whitelist using a Top Level Domain (TLD) compressed Lex Trie based Deterministic Finite Automaton (DFA) when the clicked URL does not include at least one non-ASCII character, wherein the phishing alert is generated when the popular name is identified in the URL;

identifying, by the one or more hardware processors, a misspelled popular domain name corresponding to the ASCII domain name based on an n-gram based approximate matching algorithm based on a plurality of conditions, wherein the plurality of conditions comprises at least one of the URL does not include any popular domain, the domain of the URL is not prone to IDN homograph attack and the URL is typed, by:

sorting each of a plurality of ASCII symbols associated with the ASCII domain name in lexicographic order;

dividing the plurality of sorted ASCII symbols into a plurality of domain parts based on a predetermined error tolerance value, wherein each of the plurality of domain parts are of equal size;

extracting a plurality of trigrams from each of the plurality of domain parts;

obtaining a frequency value for each of the plurality of trigrams corresponding to each of the plurality of domain parts from a frequency dictionary, wherein the frequency dictionary is constructed by:

obtaining a plurality of popular domain names from the global whitelist;

sorting each of a plurality of symbols corresponding to each of the plurality of popular domain names in lexicographic order;

extracting a plurality of trigrams from the plurality of sorted symbols corresponding to each of the plurality of popular domain names;

generating a trigram dictionary based on the extracted trigrams, wherein each row of the trigram dictionary comprises a global whitelist index of a popular domain name, a plurality of sorted symbols corresponding to the popular domain name and a plurality of trigrams corresponding to the popular domain name; and constructing a frequency dictionary based on the trigram dictionary, wherein each row of the frequency dictionary comprises a trigram, a plurality of trigram dictionary indices associated with the trigram and a frequency value corresponding to the trigram, wherein the frequency value is the number of trigram dictionary indices associated with the trigram;

sorting each of the plurality of trigrams corresponding to the plurality of domain parts in an ascending order based on the corresponding frequency value;

obtaining a plurality of candidate domain names by extracting each domain name pointed by each of the plurality of sorted trigrams based on the corresponding index and the frequency value, wherein a number of candidate domain names pointed by a trigram is equivalent to the corresponding frequency;

computing an intersection between each of the plurality of candidate domain names to obtain a plurality of misspelled domain names;

computing an edit distance between the plurality of misspelled domain names and the ASCII domain name;

obtaining the misspelled popular domain name based on the edit distance, wherein the misspelled domain name with an edit distance less than the predetermined edit distance is selected as the misspelled popular domain name; and updating the session whitelist with the misspelled popular domain name;

computing, by the one or more hardware processors, a phishing probability using logistic regression based on a plurality of features when one of, the domain is not the misspelled popular domain and the number of search results comprising the clicked URL is greater than the predefined keyword based search result threshold;

obtaining, by the one or more hardware processors, a number of hits by performing a search operation with the URL in a popular search engine when the phishing probability is less than the predefined probability threshold; and classifying, by the one or more hardware processors, the URL as phishing URL when the number of hits is less than a predefined hit threshold, wherein the session whitelist is updated if the URL is not a phishing URL.

2. The method of claim 1, wherein the local whitelist is generated by:

obtaining a plurality of browsing features associated with each of a plurality of domains from a browsing history of the user, wherein the plurality of browsing features comprises an age value, a visit value, a recency value and a typed value, wherein the age is a difference in time between a recent access to a domain and an oldest access to the domain, wherein the visit value is a number of unique days on which the user visited a domain, wherein the recency value is a time difference between the current time and a recent access time of a domain, and wherein the typed value is a Boolean value, set to one if the domain is typed and set to zero if the domain clicked, computing a score corresponding to each of the plurality of domains from the browsing history based on a decision tree, wherein the decision tree is created by assigning a score for each of the plurality of domains from the browsing history based on a predefined threshold corresponding to each of the plurality of browsing features; and updating the local whitelist with the plurality of domains with the score less than a predefined score threshold, wherein the local whitelist is updated after each browsing.

3. The method of claim 1, wherein the step of comparing the domain name with the plurality of popular domain names associated with the plurality of whitelists comprises:

comparing the domain name with the plurality of popular domain names associated with the session whitelist;

comparing the domain name with the plurality of popular domain names associated with the local whitelist, when the domain name is not matching with at least one popular domain name in the session whitelist;

comparing the domain name with the plurality of popular domain names associated with the community whitelist, when the domain name is not matching with at least one popular domain name in the local whitelist; and comparing the domain name with the plurality of popular domain names associated with the global whitelist, when the domain name is not matching with at least one popular domain name in the community whitelist.

4. The method of claim 1, wherein the community whitelist is generated as a hash map with domain name as key and a community score as value, by:

generating a buffer whitelist by receiving a plurality of domains from the local whitelist;

updating the buffer whitelist by computing a community score for each of the plurality of domains from the local whitelist, wherein the community score is computed by:

assigning a predefined maximum weight for each domain in the community whitelist when the domain is encountered for the first time; and updating the corresponding weight of each domain with a predefined minimum weight when the domain name is visited subsequently; and generating the community whitelist by selecting a plurality of domains with a predefined community score from the buffer whitelist, wherein the community whitelist is updated whenever the local whitelist is updated.

5. The method of claim 1, wherein the global whitelist comprises a plurality of popular domains across the globe.

6. The method of claim 1, wherein the pathname comprises a directory, file name and a plurality of arguments.

7. The method of claim 1, wherein the step of computing the phishing probability using logistic regression comprises:

extracting a plurality of features from the URL, wherein the plurality of features comprises a plurality of phishing keywords;

computing the phishing probability based on a precomputed weights associated with each of the plurality of phishing keywords;

classifying the URL as phishing URL based on the computed probability, wherein the URL with the probability greater than a predefined probability threshold is classified as phishing URL; and generating the phishing alarm when the probability is greater than the predefined probability threshold.

8. A system comprising:

at least one memory storing programmed instructions;

one or more Input/Output (I/O) interfaces; and one or more hardware processors operatively coupled to the at least one memory, wherein the one or more hardware processors are configured by the programmed instructions to:

receive, a Uniform Resource Locator (URL) from a browser, wherein the URL comprises a protocol name, a hostname and a pathname separated by at least one symbol, and wherein the hostname comprises a domain name and a subdomain name;

extract the domain name from the hostname of the URL;

comparing by the one or more hardware processors, the domain name with a plurality of prohibited domain names stored in a blacklist, wherein a phishing alert is generated when the domain name matches with at least one prohibited domain name stored in the blacklist;

compare the domain name with a plurality of popular domain names associated with a plurality of whitelists to check whether the URL is benign when the domain name is not matching with the at least one prohibited domain names stored in the blacklist, wherein the plurality of whitelists comprises a local whitelist, a community whitelist, a global whitelist and a session whitelist, and wherein a user is allowed to access if the URL is benign;

identify whether the hostname of the URL is an Internet Protocol (IP) address when the URL is not the benign URL, wherein the phishing alert is generated when the hostname of the URL is the IP address;

obtain a transition type associated with the URL when the hostname of the URL is other than the IP address, wherein the transition type comprises one of, a clicked URL and a typed URL;

analyze the URL when the transition type of the URL is clicked, by:

identifying whether the clicked URL is a result of a keyword based search associated with a popular search engine, wherein the URL is allowed to access when the URL is the result of the keyword based search associated with the popular search engine and when the number of search results comprising the clicked URL is greater than a predefined keyword based search result threshold;

identifying whether the clicked URL is having at least one non-American Standard Code for Information Interchange (ASCII) character when the URL is not the result of the keyword based search associated with the popular search engine;

analyzing the domain pertaining to the clicked URL to identify an Internationalized Domain Name (IDN) homograph attack, when the clicked URL includes at least one non-ASCII character, by:

normalizing a plurality of non-ASCII characters associated with the domain based on a Normalization Form Compatibility Decomposition (NFKD), wherein the NFKD decomposes each of a plurality of accented symbols associated with the domain into a Unicode symbol and an acute accent;

substituting each of a plurality of Unicode symbols associated with the domain with a corresponding ASCII character based on a confusable map to obtain an ASCII domain, wherein the confusable map provides a mapping between a plurality of the Unicode symbols and a plurality of ASCII symbols;

comparing the ASCII domain with a plurality of domains associated with each of the plurality of whitelists; and generating an IDN attack alarm when the ASCII domain matches with at least one domain name in each of the plurality of whitelists; and identifying a popular domain name in the URL by matching an ASCII domain name in the URL with a plurality of domain names associated with the global whitelist using a Top Level Domain (TLD) compressed Lex Trie based Deterministic Finite Automaton (DFA) when the clicked URL does not include at least one non-ASCII character, wherein the phishing alert is generated when the popular name is identified in the URL;

identify a misspelled popular domain name corresponding to the ASCII domain name based on an n-gram based approximate matching algorithm based on a plurality of conditions, wherein the plurality of conditions comprises at least one of the URL does not include any popular domain, the domain of the URL is not prone to IDN homograph attack and the URL is typed, by:

sorting each of a plurality of ASCII symbols associated with the ASCII domain name in lexicographic order;

dividing the plurality of sorted ASCII symbols into a plurality of domain parts based on a predetermined error tolerance value, wherein each of the plurality of domain parts are of equal size;

extracting a plurality of trigrams from each of the plurality of domain parts;

obtaining a frequency value for each of the plurality of trigrams corresponding to each of the plurality of domain parts from a frequency dictionary, wherein the frequency dictionary is constructed by:

obtaining a plurality of popular domain names from the global whitelist;

sorting each of a plurality of symbols corresponding to each of the plurality of popular domain names in lexicographic order;

extracting a plurality of trigrams from the plurality of sorted symbols corresponding to each of the plurality of popular domain names;

generating a trigram dictionary based on the extracted trigrams, wherein each row of the trigram dictionary comprises a global whitelist index of a popular domain name, a plurality of sorted symbols corresponding to the popular domain name and a plurality of trigrams corresponding to the popular domain name; and constructing a frequency dictionary based on the trigram dictionary, wherein each row of the frequency dictionary comprises a trigram, a plurality of trigram dictionary indices associated with the trigram and a frequency value corresponding to the trigram, wherein the frequency value is the number of trigram dictionary indices associated with the trigram;

sorting each of the plurality of trigrams corresponding to the plurality of domain parts in an ascending order based on the corresponding frequency value;

obtaining a plurality of candidate domain names by extracting each domain name pointed by each of the plurality of sorted trigrams based on the corresponding index and the frequency value, wherein a number of candidate domain names pointed by a trigram is equivalent to the corresponding frequency;

computing an intersection between each of the plurality of candidate domain names to obtain a plurality of misspelled domain names;

computing an edit distance between the plurality of misspelled domain names and the ASCII domain name;

obtaining the misspelled popular domain name based on the edit distance, wherein the misspelled domain name with an edit distance less than the predetermined edit distance is selected as the misspelled popular domain name; and updating the session whitelist with the misspelled popular domain name;

compute a phishing probability using logistic regression based on a plurality of features when one of, the domain is not the misspelled popular domain and the number of search results comprising the clicked URL is greater than the predefined keyword based search result threshold;

obtain a number of hits by performing a search operation with the URL in a popular search engine when the phishing probability is less than the predefined probability threshold; and classify the URL as phishing URL when the number of hits is less than a predefined hit threshold, wherein the session whitelist is updated if the URL is not a phishing URL.

9. The system of claim 8, wherein the local whitelist is generated by:

obtaining a plurality of browsing features associated with each of a plurality of domains from a browsing history of the user, wherein the plurality of browsing features comprises an age value, a visit value, a recency value and a typed value, wherein the age is a difference in time between a recent access to a domain and an oldest access to the domain, wherein the visit value is a number of unique days on which the user visited a domain, wherein the recency value is a time difference between the current time and a recent access time of a domain, and wherein the typed value is a Boolean value, set to one if the domain is typed and set to zero if the domain clicked, computing a score corresponding to each of the plurality of domains from the browsing history based on a decision tree, wherein the decision tree is created by assigning a score for each of the plurality of domains from the browsing history based on a predefined threshold corresponding to each of the plurality of browsing features; and updating the local whitelist with the plurality of domains with the score less than a predefined score threshold, wherein the local whitelist is updated after each browsing.

10. The system of claim 8, wherein the step of comparing the domain name with the plurality of popular domain names associated with the plurality of whitelists comprises:

comparing the domain name with the plurality of popular domain names associated with the session whitelist;

comparing the domain name with the plurality of popular domain names associated with the local whitelist, when the domain name is not matching with at least one popular domain name in the session whitelist;

comparing the domain name with the plurality of popular domain names associated with the community whitelist, when the domain name is not matching with at least one popular domain name in the local whitelist; and comparing the domain name with the plurality of popular domain names associated with the global whitelist, when the domain name is not matching with at least one popular domain name in the community whitelist.

11. The system of claim 8, wherein the community whitelist is generated as a hash map with domain name as key and a community score as value, by:

generating a buffer whitelist by receiving a plurality of domains from the local whitelist;

updating the buffer whitelist by computing a community score for each of the plurality of domains from the local whitelist, wherein the community score is computed by:

assigning a predefined maximum weight for each domain in the community whitelist when the domain is encountered for the first time; and updating the corresponding weight of each domain with a predefined minimum weight when the domain name is visited subsequently; and generating the community whitelist by selecting a plurality of domains with a predefined community score from the buffer whitelist, wherein the community whitelist is updated whenever the local whitelist is updated.

12. The system of claim 8, wherein the global whitelist comprises a plurality of popular domains across the globe.

13. The system of claim 8, wherein the pathname comprises a directory, file name and a plurality of arguments.

14. The system of claim 8, wherein the step of computing the phishing probability using logistic regression comprises:

extracting a plurality of features from the URL, wherein the plurality of features comprises a plurality of phishing keywords;

computing the phishing probability based on a precomputed weights associated with each of the plurality of phishing keywords;

classifying the URL as phishing URL based on the computed probability, wherein the URL with the probability greater than a predefined probability threshold is classified as phishing URL; and generating the phishing alarm when the probability is greater than the predefined probability threshold.

15. One or more non-transitory machine readable information storage mediums comprising one or more instructions which when executed by one or more hardware processors causes: receiving, by one or more hardware processors, a Uniform Resource Locator (URL) from a browser, wherein the URL comprises a protocol name, a hostname and a pathname separated by at least one symbol, and wherein the hostname comprises a domain name and a subdomain name;

extracting, by the one or more hardware processors, the domain name from the hostname of the URL;

comparing, by the one or more hardware processors, the domain name with a plurality of prohibited domain names stored in a blacklist, wherein a phishing alert is generated when the domain name matches with at least one prohibited domain name stored in the blacklist;

comparing, by the one or more hardware processors, the domain name with a plurality of popular domain names associated with a plurality of whitelists to check whether the URL is benign when the domain name is not matching with the at least one prohibited domain names stored in the blacklist, wherein the plurality of whitelists comprises a local whitelist, a community whitelist, a global whitelist and a session whitelist, and wherein a user is allowed to access if the URL is benign;

identifying, by the one or more hardware processors, whether the hostname of the URL is an Internet Protocol (IP) address when the URL is not the benign URL, wherein the phishing alert is generated when the hostname of the URL is the IP address;

obtaining, by the one or more hardware processors, a transition type associated with the URL when the hostname of the URL is other than the IP address, wherein the transition type comprises one of, a clicked URL and a typed URL;

analyzing, by the one or more hardware processors, the URL when the transition type of the URL is clicked, by:

identifying whether the clicked URL is a result of a keyword based search associated with a popular search engine, wherein the URL is allowed to access when the URL is the result of the keyword based search associated with the popular search engine and when the number of search results comprising the clicked URL is greater than a predefined keyword based search result threshold;

identifying whether the clicked URL is having at least one non-American Standard Code for Information Interchange (ASCII) character when the URL is not the result of the keyword based search associated with the popular search engine;

analyzing the domain pertaining to the clicked URL to identify an Internationalized Domain Name (IDN) homograph attack, when the clicked URL includes at least one non-ASCII character, by:

normalizing a plurality of non-ASCII characters associated with the domain based on a Normalization Form Compatibility Decomposition (NFKD), wherein the NFKD decomposes each of a plurality of accented symbols associated with the domain into a Unicode symbol and an acute accent;

substituting each of a plurality of Unicode symbols associated with the domain with a corresponding ASCII character based on a confusable map to obtain an ASCII domain, wherein the confusable map provides a mapping between a plurality of the Unicode symbols and a plurality of ASCII symbols;

comparing the ASCII domain with a plurality of domains associated with each of the plurality of whitelists; and generating an IDN attack alarm when the ASCII domain matches with at least one domain name in each of the plurality of whitelists; and identifying a popular domain name in the URL by matching an ASCII domain name in the URL with a plurality of domain names associated with the global whitelist using a Top Level Domain (TLD) compressed Lex Trie based Deterministic Finite Automaton (DFA) when the clicked URL does not include at least one non-ASCII character, wherein the phishing alert is generated when the popular name is identified in the URL;

identifying, by the one or more hardware processors, a misspelled popular domain name corresponding to the ASCII domain name based on an n-gram based approximate matching algorithm based on a plurality of conditions, wherein the plurality of conditions comprises at least one of the URL does not include any popular domain, the domain of the URL is not prone to IDN homograph attack and the URL is typed, by:

sorting each of a plurality of ASCII symbols associated with the ASCII domain name in lexicographic order;

dividing the plurality of sorted ASCII symbols into a plurality of domain parts based on a predetermined error tolerance value, wherein each of the plurality of domain parts are of equal size;

extracting a plurality of trigrams from each of the plurality of domain parts;

obtaining a frequency value for each of the plurality of trigrams corresponding to each of the plurality of domain parts from a frequency dictionary, wherein the frequency dictionary is constructed by:

obtaining a plurality of popular domain names from the global whitelist;

sorting each of a plurality of symbols corresponding to each of the plurality of popular domain names in lexicographic order;

extracting a plurality of trigrams from the plurality of sorted symbols corresponding to each of the plurality of popular domain names;

generating a trigram dictionary based on the extracted trigrams, wherein each row of the trigram dictionary comprises a global whitelist index of a popular domain name, a plurality of sorted symbols corresponding to the popular domain name and a plurality of trigrams corresponding to the popular domain name; and constructing a frequency dictionary based on the trigram dictionary, wherein each row of the frequency dictionary comprises a trigram, a plurality of trigram dictionary indices associated with the trigram and a frequency value corresponding to the trigram, wherein the frequency value is the number of trigram dictionary indices associated with the trigram;

sorting each of the plurality of trigrams corresponding to the plurality of domain parts in an ascending order based on the corresponding frequency value;

obtaining a plurality of candidate domain names by extracting each domain name pointed by each of the plurality of sorted trigrams based on the corresponding index and the frequency value, wherein a number of candidate domain names pointed by a trigram is equivalent to the corresponding frequency;

computing an intersection between each of the plurality of candidate domain names to obtain a plurality of misspelled domain names;

computing an edit distance between the plurality of misspelled domain names and the ASCII domain name;

obtaining the misspelled popular domain name based on the edit distance, wherein the misspelled domain name with an edit distance less than the predetermined edit distance is selected as the misspelled popular domain name; and updating the session whitelist with the misspelled popular domain name;

computing, by the one or more hardware processors, a phishing probability using logistic regression based on a plurality of features when one of, the domain is not the misspelled popular domain and the number of search results comprising the clicked URL is greater than the predefined keyword based search result threshold;

obtaining, by the one or more hardware processors, a number of hits by performing a search operation with the URL in a popular search engine when the phishing probability is less than the predefined probability threshold; and classifying, by the one or more hardware processors, the URL as phishing URL when the number of hits is less than a predefined hit threshold, wherein the session whitelist is updated if the URL is not a phishing URL.

16. The one or more non-transitory machine readable information storage mediums of claim 15, wherein the local whitelist is generated by:

obtaining a plurality of browsing features associated with each of a plurality of domains from a browsing history of the user, wherein the plurality of browsing features comprises an age value, a visit value, a recency value and a typed value, wherein the age is a difference in time between a recent access to a domain and an oldest access to the domain, wherein the visit value is a number of unique days on which the user visited a domain, wherein the recency value is a time difference between the current time and a recent access time of a domain, and wherein the typed value is a Boolean value, set to one if the domain is typed and set to zero if the domain clicked, computing a score corresponding to each of the plurality of domains from the browsing history based on a decision tree, wherein the decision tree is created by assigning a score for each of the plurality of domains from the browsing history based on a predefined threshold corresponding to each of the plurality of browsing features; and updating the local whitelist with the plurality of domains with the score less than a predefined score threshold, wherein the local whitelist is updated after each browsing.

17. The one or more non-transitory machine readable information storage mediums of claim 15, wherein the step of comparing the domain name with the plurality of popular domain names associated with the plurality of whitelists comprises:
- comparing the domain name with the plurality of popular domain names associated with the session whitelist;
- comparing the domain name with the plurality of popular domain names associated with the local whitelist, when the domain name is not matching with at least one popular domain name in the session whitelist;
- comparing the domain name with the plurality of popular domain names associated with the community whitelist, when the domain name is not matching with at least one popular domain name in the local whitelist; and
- comparing the domain name with the plurality of popular domain names associated with the global whitelist, when the domain name is not matching with at least one popular domain name in the community whitelist.

18. The one or more non-transitory machine readable information storage mediums of claim 15, wherein the community whitelist is generated as a hash map with domain name as key and a community score as value, by:
- generating a buffer whitelist by receiving a plurality of domains from the local whitelist;
- updating the buffer whitelist by computing a community score for each of the plurality of domains from the local whitelist, wherein the community score is computed by:
  - assigning a predefined maximum weight for each domain in the community whitelist when the domain is encountered for the first time; and
  - updating the corresponding weight of each domain with a predefined minimum weight when the domain name is visited subsequently; and
- generating the community whitelist by selecting a plurality of domains with a predefined community score from the buffer whitelist, wherein the community whitelist is updated whenever the local whitelist is updated.

19. The one or more non-transitory machine readable information storage mediums of claim 15, wherein the global whitelist comprises a plurality of popular domains across the globe and, wherein the pathname comprises a directory, file name and a plurality of arguments.

20. The one or more non-transitory machine readable information storage mediums of claim 15, wherein the step of computing the phishing probability using logistic regression comprises:
- extracting a plurality of features from the URL, wherein the plurality of features comprises a plurality of phishing keywords;
- computing the phishing probability based on a precomputed weights associated with each of the plurality of phishing keywords;
- classifying the URL as phishing URL based on the computed probability, wherein the URL with the probability greater than a predefined probability threshold is classified as phishing URL; and
- generating the phishing alarm when the probability is greater than the predefined probability threshold.

* * * * *